(12) United States Patent
Hampden-Smith et al.

(10) Patent No.: US 8,227,117 B2
(45) Date of Patent: Jul. 24, 2012

(54) MODIFIED CARBON PRODUCTS, THEIR USE IN ELECTROCATALYSTS AND ELECTRODE LAYERS AND SIMILAR DEVICES AND METHODS RELATING TO THE SAME

(75) Inventors: Mark J. Hampden-Smith, Albuquerque, NM (US); Paolina Atanassova, Albuquerque, NM (US); Gordon L. Rice, Albuquerque, NM (US); James Caruso, Albuquerque, NM (US); James Brewster, Rio Rancho, NM (US); Rimple Bhatia, Placitas, NM (US); Paul Napolitano, Albuquerque, NM (US); Bogdan Gurau, Urbana, IL (US)

(73) Assignee: Cabot Corporation, Boston, MA (US)

( * ) Notice: Subject to any disclaimer, the term of this patent is extended or adjusted under 35 U.S.C. 154(b) by 1612 days.

(21) Appl. No.: 11/081,752

(22) Filed: Mar. 15, 2005

(65) Prior Publication Data

US 2005/0233183 A1    Oct. 20, 2005

Related U.S. Application Data

(60) Provisional application No. 60/553,612, filed on Mar. 15, 2004, provisional application No. 60/553,413, filed on Mar. 15, 2004, provisional application No. 60/553,672, filed on Mar. 15, 2004, provisional application No. 60/553,611, filed on Mar. 15, 2004.

(51) Int. Cl.
| | |
|---|---|
| *H01M 8/00* | (2006.01) |
| *H01M 4/02* | (2006.01) |
| *B01J 23/00* | (2006.01) |
| *B01J 31/00* | (2006.01) |

(52) U.S. Cl. ........ 429/400; 429/523; 429/535; 502/182; 502/159

(58) Field of Classification Search .................. 429/400, 429/535, 523; 502/159, 182
See application file for complete search history.

(56) References Cited

U.S. PATENT DOCUMENTS

| | | | |
|---|---|---|---|
| 2,502,254 A | 3/1950 | Glassman | 106/289 |
| 2,514,236 A | 7/1950 | Glassman | 106/289 |
| 3,025,259 A | 3/1962 | Watson et al. | 260/41.5 |
| 3,043,708 A | 7/1962 | Watson et al. | 106/307 |
| 3,335,020 A | 8/1967 | Aboytes et al. | 106/307 |
| 3,361,595 A | 1/1968 | Young et al. | 136/122 |
| 3,479,300 A | 11/1969 | Rivin et al. | 252/430 |
| 4,014,844 A | 3/1977 | Vidal et al. | 260/31.2 R |
| 4,019,188 A | 4/1977 | Hochberg et al. | 346/75 |

(Continued)

FOREIGN PATENT DOCUMENTS

WO    WO 92/13983    8/1992

OTHER PUBLICATIONS

Delmar et al., Covalent Modification of Carbon Surfaces by Grafting of Functionalized Aryl Radicals Produced From Electrochemical Reduction of Diazonium Salts, Journal American Chemical. Society, vol. 114, pp. 5883-5884 (1992).

(Continued)

*Primary Examiner* — Karie O'Neill Apicella
(74) *Attorney, Agent, or Firm* — Marsh Fischmann & Breyfogle LLP

(57) ABSTRACT

Electrodes and electrocatalyst layers incorporating modified carbon products. The modified carbon products may advantageously enhance the properties of an electrode or electrode layer, leading to more efficiency within the a fuel cell or similar device.

20 Claims, 18 Drawing Sheets

U.S. PATENT DOCUMENTS

| | | | |
|---|---|---|---|
| 4,216,073 A | 8/1980 | Goldstein | 204/296 |
| 4,627,875 A | 12/1986 | Kobayashi et al. | 106/22 |
| 4,877,451 A | 10/1989 | Winnik et al. | 106/23 |
| 5,110,779 A | 5/1992 | Hucul | 502/185 |
| 5,155,081 A | 10/1992 | Steigleiter et al. | 502/185 |
| 5,329,293 A | 7/1994 | Liker | 347/11 |
| 5,554,739 A | 9/1996 | Belmont | 534/885 |
| 5,559,169 A | 9/1996 | Belmont et al. | 523/215 |
| 5,569,635 A | 10/1996 | Moy et al. | 502/185 |
| 5,571,311 A | 11/1996 | Belmont et al. | 106/20 R |
| 5,575,845 A | 11/1996 | Belmont et al. | 106/712 |
| 5,630,868 A | 5/1997 | Belmont et al. | 106/31.75 |
| 5,672,198 A | 9/1997 | Belmont | 106/20 R |
| 5,677,074 A | 10/1997 | Serpico et al. | 429/43 |
| 5,679,724 A | 10/1997 | Sacripante et al. | 523/161 |
| 5,725,647 A | 3/1998 | Carlson et al. | 106/31.86 |
| 5,725,672 A | 3/1998 | Schmitt et al. | 118/715 |
| 5,837,041 A | 11/1998 | Bean et al. | 106/31.6 |
| 5,837,045 A | 11/1998 | Johnson et al. | 106/31.85 |
| 5,843,519 A * | 12/1998 | Tada | 427/115 |
| 5,853,470 A | 12/1998 | Martin et al. | 106/31.86 |
| 5,900,029 A | 5/1999 | Belmont et al. | 8/550 |
| 6,066,410 A | 5/2000 | Auer et al. | 429/40 |
| 6,103,380 A | 8/2000 | Devonport | 428/403 |
| 6,103,393 A | 8/2000 | Kodas et al. | 428/570 |
| 6,107,350 A | 8/2000 | Boes et al. | 516/100 |
| 6,110,994 A | 8/2000 | Cooke et al. | 523/215 |
| 6,194,338 B1 | 2/2001 | Andolfatto et al. | 502/101 |
| 6,251,488 B1 | 6/2001 | Miller et al. | 427/596 |
| 6,280,871 B1 | 8/2001 | Tosco et al. | 429/41 |
| 6,284,213 B1 | 9/2001 | Paparatto et al. | 423/403 |
| 6,338,809 B1 | 1/2002 | Hampden-Smith et al. | 264/7 |
| 6,339,038 B1 | 1/2002 | Tada et al. | 502/326 |
| 6,399,202 B1 | 6/2002 | Yu et al. | 428/403 |
| 6,417,133 B1 | 7/2002 | Ebner et al. | 502/185 |
| 6,432,320 B1 | 8/2002 | Bonsignore et al. | 252/70 |
| 6,458,458 B1 | 10/2002 | Cooke et al. | 428/407 |
| 6,492,295 B2 | 12/2002 | Hitomi et al. | 502/159 |
| 6,522,522 B2 | 2/2003 | Yu et al. | 361/502 |
| 6,586,501 B1 | 7/2003 | Dalton et al. | 523/215 |
| 6,660,680 B1 | 12/2003 | Hampden-Smith et al. | 502/180 |
| 6,746,982 B2 | 6/2004 | Hertel et al. | 502/180 |
| 2003/0017379 A1 | 1/2003 | Menashi | 429/44 |
| 2003/0022055 A1 * | 1/2003 | Menashi | 429/44 |
| 2003/0124414 A1 | 7/2003 | Hertel et al. | 429/44 |
| 2004/0038808 A1 | 2/2004 | Hampden-Smith et al. | 502/180 |

OTHER PUBLICATIONS

Tsubakowa; Functionalization of Carbon Black by Surface Grafting of Polymers, Polym. Sci.; vol. 17, pp. 417-470, 1992.

* cited by examiner

MODIFIED CARBON PRODUCTS, THEIR USE IN ELECTROCATALYSTS AND ELECTRODE LAYERS AND SIMILAR DEVICES AND METHODS RELATING TO THE SAME

CROSS-REFERENCE TO RELATED APPLICATIONS AND CLAIM OF PRIORITY BENEFIT

Pursuant to 35 U.S.C. §119(e), this patent application claims a priority benefit to: (a) U.S. Provisional Patent Application No. 60/553,612 entitled "MODIFIED CARBON PRODUCTS AND THEIR USE IN GAS DIFFUSION LAYERS" filed Mar. 15, 2004; (b) U.S. Provisional Patent Application No. 60/553,413 entitled "MODIFIED CARBON PRODUCTS AND THEIR USE IN ELECTROCATALYSTS AND ELECTRODE LAYERS" filed Mar. 15, 2004; (c) U.S. Provisional Patent Application No. 60/553,672 entitled "MODIFIED CARBON PRODUCTS AND THEIR USE IN PROTON EXCHANGE MEMBRANES" filed Mar. 15, 2004; and (d) U.S. Provisional Patent Application No. 60/553,611 entitled "MODIFIED CARBON PRODUCTS AND THEIR USE IN BIPOLAR PLATES" filed Mar. 15, 2004. This application is also related to U.S. patent application Ser. No. 11/081,754, entitled "MODIFIED CARBON PRODUCTS, THEIR USE IN BIPOLAR PLATES AND SIMILAR DEVICES AND METHODS RELATING TO THE SAME", filed on Mar. 15, 2005, and U.S. patent application Ser. No. 11/081,768, entitled "MODIFIED CARBON PRODUCTS, THEIR USE IN FLUID/GAS DIFFUSION LAYERS AND SIMILAR DEVICES AND METHODS RELATING TO THE SAME", filed on Mar. 15, 2005, and U.S. patent application Ser. No. 11/081,765, entitled "MODIFIED CARBON PRODUCTS, THEIR USE IN PROTON EXCHANGE MEMBRANES AND SIMILAR DEVICES AND METHODS RELATING TO THE SAME", filed on Mar. 15, 2005. Each of the above referenced patent applications is hereby incorporated herein by reference in its entirety.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract (Award) No. 70NAN2B3021 awarded by the National Institute of Standards and Technology (NIST).

BACKGROUND OF THE INVENTION

1. Field of the Invention

The present invention relates to the production and use of modified carbon products in fuel cell components and similar devices. Specifically, the present invention relates to electrodes and electrocatalyst layers incorporating modified carbon products and methods for making electrodes and electrocatalyst layers including modified carbon products. The modified carbon products can be used to enhance and tailor the properties of the electrode and electrocatalyst layers.

2. Description of Related Art

Fuel cells are electrochemical devices that are capable of converting the energy of a chemical reaction into electrical energy without combustion and with virtually no pollution. Fuel cells are unlike batteries in that fuel cells convert chemical energy to electrical energy as the chemical reactants are continuously delivered to the fuel cell. As a result, fuel cells are used to produce a continuous source of electrical energy, and compete with other forms of continuous energy production such as the combustion engine, nuclear power and coal-fired power stations. Different types of fuel cells are categorized by the electrolyte used in the fuel cell. The five main types of fuel cells are alkaline, molten carbonate, phosphoric acid, solid oxide and proton exchange membrane (PEM), also known as polymer electrolyte fuel cells (PEFCs). One particularly useful fuel cell is the proton exchange membrane fuel cell (PEMFC).

A PEMFC typically includes tens to hundreds of MEAs each of which includes a cathode layer and an anode layer. One embodiment of a MEA is illustrated in FIGS. 1(a) and 1(b). One embodiment of a cathode side of an MEA is also depicted in FIG. 2. With references to FIGS. 1(a), 1(b) and 2, the anode electrocatalyst layer 104 and cathode electrocatalyst layer 106 sandwich a proton exchange membrane 102. In some instances, the combined membrane and electrode layer is referred to as a catalyst coated membrane 103. Power is generated when a fuel (e.g., hydrogen gas) is fed into the anode 104 and oxygen (air) 106 is fed into the cathode. In a reaction typically catalyzed by a platinum-based catalyst in the catalyst layer of the anode 104, the hydrogen ionizes to form protons and electrons. The protons are transported through the proton exchange membrane 102 to a catalyst layer on the opposite side of the membrane (the cathode), where another catalyst, typically platinum or a platinum alloy, catalyzes an oxygen-reduction reaction to form water. The reactions can be written as follows:

$$\text{Anode: } 2H_2 \rightarrow 4H^+ + 4e^- \tag{1}$$

$$\text{Cathode: } 4H^+ + 4e^- + O_2 \rightarrow 2H_2O \tag{2}$$

$$\text{Overall: } 2H_2 + O_2 \rightarrow 2H_2O \tag{3}$$

Electrons formed at the anode and cathode are routed through bipolar plates 114 connected to an electrical circuit. On either side of the anode 104 and cathode 106 are porous gas diffusion layers 108, which generally comprise a carbon support layer 107 and a microporous layer 109, that help enable the transport of reactants ($H_2$ and $O_2$ when hydrogen gas is the fuel) to the anode and the cathode. On the anode side, fuel flow channels 110 may be provided for the transport of fuel, while on the cathode side, oxidizer flow channels 112 may be provided for the transport of an oxidant. These channels may be located in the bipolar plates 114. Finally, cooling water passages 116 can be provided adjacent to or integral with the bipolar plates for cooling the MEA/fuel cell.

A particularly preferred fuel cell for portable applications, due to its compact construction, power density, efficiency and operating temperature, is a PEMFC that can utilize methanol ($CH_3OH$) directly without the use of a fuel reformer to convert the methanol to $H_2$. This type of fuel cell is typically referred to as a direct methanol fuel cell (DMFC). DMFCs are attractive for applications that require relatively low power, because the anode reforms the methanol directly into hydrogen ions that can be delivered to the cathode through the PEM. Other liquid fuels that may also be used in a fuel cell include formic acid, formaldehyde, ethanol and ethylene glycol.

Like a PEMFC, a DMFC also is made of a plurality of membrane electrode assemblies (MEAs). A cross-sectional view of a typical MEA is illustrated in FIG. 3 (not to scale). The MEA 300 comprises a PEM 302, an anode electrocatalyst layer 304, cathode electrocatalyst layer 306, fluid distribution layers 308, and bipolar plates 314. The electrocatalyst layers 304, 306 sandwich the PEM 302 and catalyze the reactions that generate the protons and electrons to power the fuel cell, as shown below. The fluid diffusion layer 308 distributes the reactants and products to and from the electrocatalyst layers 304, 306. The bipolar plates 314 are disposed between the anode and cathode of sequential MEA stacks, and comprise current collectors 317 and fuel and oxidizer flow channels, 310, 312, respectively, for directing the flow of incoming reactant fluid to the appropriate electrode. Two end plates (not shown), similar to the bipolar plates, are used to complete the fuel cell stack.

Operation of the DMFC is similar to a hydrogen-gas based PEMFC, except that methanol is supplied to the anode instead of hydrogen gas. Methanol flows through the fuel flow channels 310 of bipolar plate 314, through the fluid distribution layer 308 and to the anode electrocatalyst layer 304, where it decomposes into carbon dioxide gas, protons and electrons. Oxygen flows through the oxidizer flow channels 312 of the bipolar plate 314, through the fluid distribution layer 308, and to the cathode electrocatalyst layer, where ionized oxygen is produced. Protons from the anode pass through the PEM 302, and recombine with the electrons and ionized oxygen to form water. Carbon dioxide is produced at the anode 304 and is removed through the exhaust of the cell. The foregoing reactions can be written as follows:

$$\text{Anode: } CH_3OH + H_2O \rightarrow CO_2 + 6H^+ + 6e^- \qquad (4)$$

$$\text{Cathode: } 6H^+ + 6e^- + \tfrac{3}{2}O_2 \rightarrow 3H_2O \qquad (5)$$

$$\text{Overall: } 2CH_3OH + 3O_2 \rightarrow 2CO_2 + 6H_2O + \text{energy} \qquad (6)$$

There are a number of properties that are required for efficient fuel cell operation. Typical properties desired for electrode operation include high utilization of catalysts and effective mass transport. Typically, electrocatalyst materials, such as platinum (Pt) dispersed on a conductive support (e.g. carbon), are utilized in the electrode layers to catalyze the foregoing reactions. Current PEMFCs typically include platinum electrocatalysts with a total loading of about 1 milligram of platinum per square centimeter of electrode (1 mgPt/cm$^2$), including both the anode and cathode. At a typical cell performance of 0.42 Watts per square centimeter, about 2.4 grams of platinum per kilowatt is required (1 mgPt/cm$^2$ over 0.42 Watts/cm$^2$). In the case of liquid fuel, such as methanol, alloy catalyst such as PtRu can be used. Current DMFCs typically include PtRu electrocatalysts with a total loading of about 8 mg (Pt+Ru)/cm$^2$, which equates to about 200 grams of precious metal per kilowatt at a performance of 0.04 Watts per square centimeter.

Platinum metal is very expensive, which often equates to expensive fuel cell production costs. Reducing the amount of catalytically active material in the electrode, however, is not a suitable solution to reduce cost, because of the equivalently strong demand for improved cell performance. Moreover, excess platinum metal is often used to compensate for catalyst materials that go unutilized or are underutilized due to their remote location from gas/fluid distribution channels and/or proton conduction sites. Thus, there is a need to enhance catalyst use in the electrode to maintain performance, but at lower loading levels.

Other issues associated with increasing the performance of the electrodes include: a) prevention of active phase agglomeration and loss of catalyst active area during the operation of the fuel cell; b) locating the proton conductive sites proximal to the active catalytic sites; c) ensuring long term stability of the electrode performance by minimizing the amount of impurities that poison the membrane and active sites; and d) enhancing porosity of the electrode for transport of reactants and products.

Carbon is a material that has previously been used for some components of the fuel cell structure. For example, U.S. Pat. No. 6,280,871 by Tosco et al. discloses gas diffusion electrodes containing carbon products. The carbon product can be used for at least one component of the electrodes, such as the active layer and/or the blocking layer. Methods to extend the service life of the electrodes, as well as methods to reduce the amount of fluorine-containing compounds are also disclosed. Similar products and methods are described in U.S. Pat. No. 6,399,202 by Yu et al. Each of the foregoing patents is incorporated herein by reference in its entirety.

U.S. patent application Publication No. 2003/0017379 by Menashi, which is incorporated herein by reference in its entirety, discloses fuel cells including a gas diffusion electrode, gas diffusion counter-electrode, and an electrolyte membrane located between the electrode and counter-electrode. The electrode, counter-electrode, or both, contain at least one carbon product. The electrolyte membranes can also contain carbon products. Similar products and methods are described in U.S. patent application Publication No. 2003/0022055 by Menashi, which is also incorporated herein by reference in its entirety.

U.S. patent application Publication No. 2003/0124414 by Hertel et al., which is incorporated herein by reference in its entirety, discloses a porous carbon body for a fuel cell having an electronically conductive hydrophilic agent and discloses a method for the manufacture of the carbon body. The porous carbon body comprises an electronically conductive graphite powder in an amount of between 60 and 80 weight percent of the body, carbon fiber in an amount of between 5 and 15 weight percent of the body, a thermoset binder in an amount between 6 and 18 weight percent of the body and an electronically created modified carbon black. Hertel et al. disclose that the carbon body provides increased wettability without any decrease in electrical conductivity, and can be manufactured without high temperature steps to add graphite to the body or to incorporate post molding hydrophilic agents into pores of the body.

SUMMARY OF THE INVENTION

According to one aspect of the present invention, an electrocatalyst is provided, the electrocatalyst comprising an active species phase dispersed on a carbon support structure, wherein the carbon support structure is a modified carbon product. According to one embodiment of the present aspect, the modified carbon product includes a hydrophilic functional group. According to another embodiment, the modified carbon product includes a hydrophobic functional group. In one embodiment, the modified carbon product includes at least two different functional groups. In yet another embodiment, the modified carbon product includes at least a hydrophobic functional group and a hydrophilic functional group. In one embodiment, the modified carbon product includes a functional group that is proton conducting. In yet another embodiment, the modified carbon product includes a functional group that is polymeric. In another embodiment, the modified carbon product comprises a functional group that is adapted to reduce carbon oxidation. In yet another embodiment, the modified carbon product includes a functional group that is adapted to reduce agglomeration of the active species phase. In yet another embodiment, the modified carbon product includes at least two functional groups selected from the group of a proton conducting functional group or a polymeric functional group.

According to another aspect of the present invention, a fuel cell including an electrode is provided, where the electrode includes an electrocatalyst, the electrocatalyst comprising an active species phase dispersed on a carbon support structure, wherein the carbon support structure is a modified carbon product. In one embodiment of the present aspect, the modified carbon product may include a molecular or ionic metal species bonded to a surface functional group. In one embodiment, the molecular or ionic metal species is within the electrode layer. In yet another embodiment, the modified carbon product includes a functional group that is polymeric. In another embodiment, the modified carbon product comprises a functional group that is adapted to reduce carbon oxidation. In yet another embodiment, the modified carbon product includes a functional group that is adapted to reduce agglomeration of the active species phase. In yet another embodiment, the modified carbon product includes at least two functional groups selected from the group of a proton conducting functional group or a polymeric functional group. In one embodiment, the modified carbon product is adapted to increase the adhesion of the electrode to at least one of an adjacent gas diffusion layer or a proton exchange membrane. In another embodiment, the electrode includes substantially no polymer proton conducting phase.

According to another aspect of the present invention, a method for making an electrocatalyst is provided, the method including the steps of providing a carbon support, covalently attaching a functional group to the carbon support to form a modified carbon support product, and depositing an active species phase on the modified carbon support product to form an electrocatalyst. In one embodiment of the present aspect, the attaching step includes the step of reacting a diazonium salt in the presence of the carbon support. In one embodiment, the carbon support is carbon black. In another embodiment, the carbon support is graphitic carbon. In yet another embodiment, the depositing step includes the step of reacting an active species phase precursor in the presence of the modified carbon support product. In one embodiment, the active species phase precursor preferentially attaches to the functional group. In another embodiment, the active species phase precursor preferentially attaches to the surface of the carbon support. In one embodiment, the functional group is a hydrophobic group. In another embodiment, the functional group is a hydrophilic group. In yet another embodiment, the functional group is a proton conducting group. In yet another embodiment, the functional group is a proton conducting group, where the proton conducting group is selected from the group of carboxylic acids, sulfonic acids, phosphonic acids and phosphonic acid salts. In one embodiment, the functional group is covalently attached to the carbon support by a linking group, where the linking group is selected from the group of alkyls, aryls, halogenated alkyls, halogenated aryls, substituted alkyls, substituted aryls, polymers and substituted polymers. In yet another embodiment, the active species phase, comprises platinum. In another embodiment, the active species phase comprises platinum and ruthenium. In another embodiment, the active species phase includes cobalt. In another embodiment, the active species phase includes nickel. In another embodiment, the active species phase includes platinum, nickel and cobalt. In yet another embodiment, the active species phase includes platinum, chromium and cobalt. In yet another embodiment, the active species phase includes iron. In one embodiment, the active species phase includes a metal oxide, where the metal oxide includes at least one of the elements selected from the group of Pt, Ag, Pd, Ru, Os, Ni, Rh, Ir, Co, Cr, Mo, W, V, Nb, Al, Ta, Ti, Zr, Hf, Zn, Fe, Cu, Ga, In, Si, Ge, Sn, Y, La and lanthanide metals. In yet another embodiment, the active species phase includes an alloy of Pt with at least one other metal selected from the group of Ru, Os, Cr, Ni, Mn and Co. In yet another embodiment, the covalently attaching step includes spray processing a precursor solution including a carbon material and a diazonium salt. In another embodiment, the depositing step includes the step of spray processing the precursor solution, where the precursor solution further includes a precursor to the active species phase. In one embodiment, the precursor to the active species phase includes a platinum compound.

According to another aspect of the president invention, a method for making an electrocatalyst is provided, the method including the steps of providing an electrocatalyst particle including an active species phase dispersed on a carbon support phase and modifying the carbon support by covalently attaching a functional group to carbon support to form a modified carbon support phase. According to one embodiment of the present aspect, the modifying step includes the step of reacting a diazonium salt in the presence of the electrocatalyst particle. In another embodiment, the carbon support includes carbon black. In yet another embodiment, the active species phase includes platinum. In yet another embodiment, the active species phase includes platinum and ruthenium. In one embodiment, the functional group is a hydrophobic group. In another embodiment, the functional group is a hydrophilic group. In another embodiment, the active species phase includes cobalt. In another embodiment, the active species phase includes nickel. In another embodiment, the active species phase includes platinum, nickel and cobalt. In yet another embodiment, the active species phase includes platinum, chromium and cobalt. In yet another embodiment, the active species phase includes iron. In one embodiment, the active species phase includes a metal oxide, where the metal oxide includes at least one of the elements selected from the group of Pt, Ag, Pd, Ru, Os, Ni, Rh, Ir, Co, Cr, Mo, W, V, Nb, Al, Ta, Ti, Zr, Hf, Zn, Fe, Cu, Ga, In, Si, Ge, Sn, Y, La and lanthanide metals. In yet another minded, the active species phase includes an alloy of Pt with at least one other metal selected from the group of Ru, Os, Cr, Ni, Mn and Co. In yet another embodiment, the modifying step includes the step of spray processing the precursor solution, where the precursor solution includes electrocatalyst particles and a diazonium salt. In one embodiment, the spray processing step comprises spray processing in a spray dryer.

DETAILED DESCRIPTION OF THE INVENTION

Figure 1:
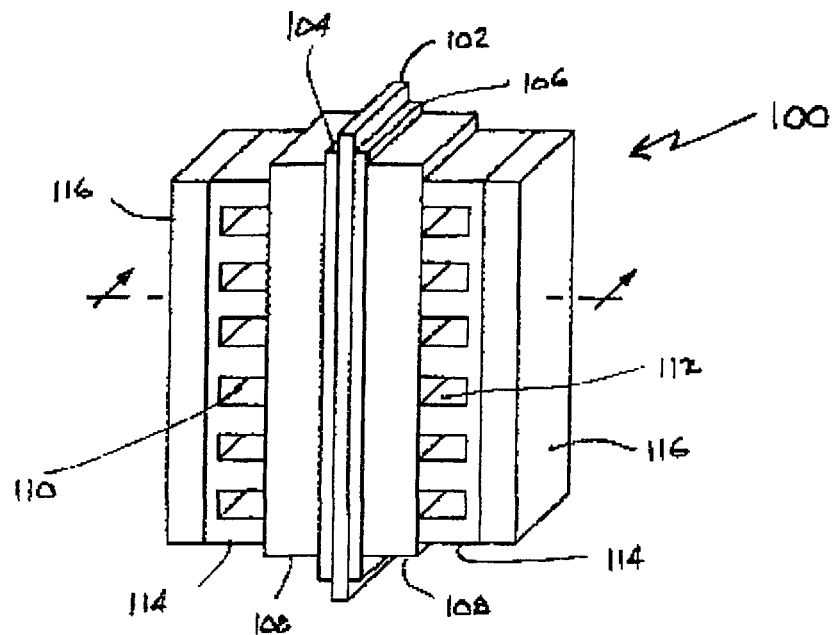
FIGS. 1(a) and 1(b) illustrate a schematic cross-section of a PEMFC MEA and bipolar plate assembly according to the prior art.
Figure 1:
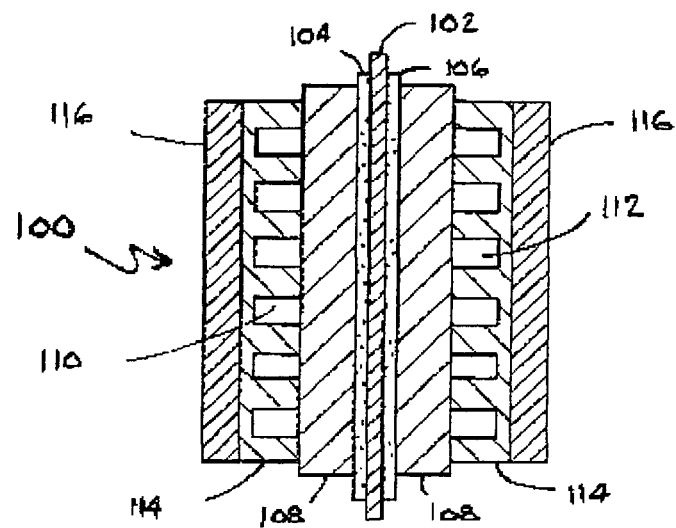
Figure 2:
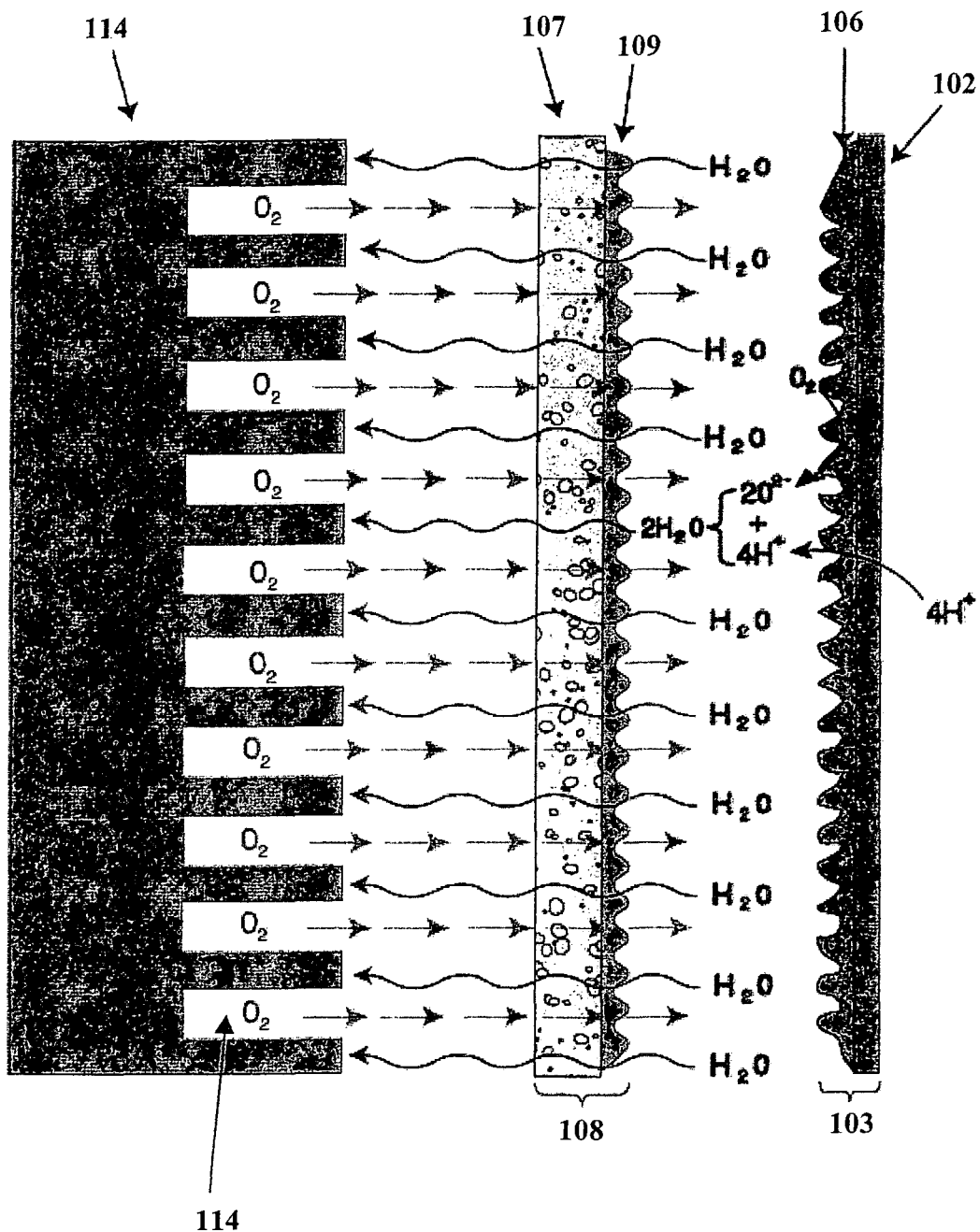
FIG. 2 illustrates a cross-section of the cathode side of an MEA showing the membrane and bipolar plate and $O_2$, $H^+$ and $H_2O$ transport according to the prior art.
Figure 3:
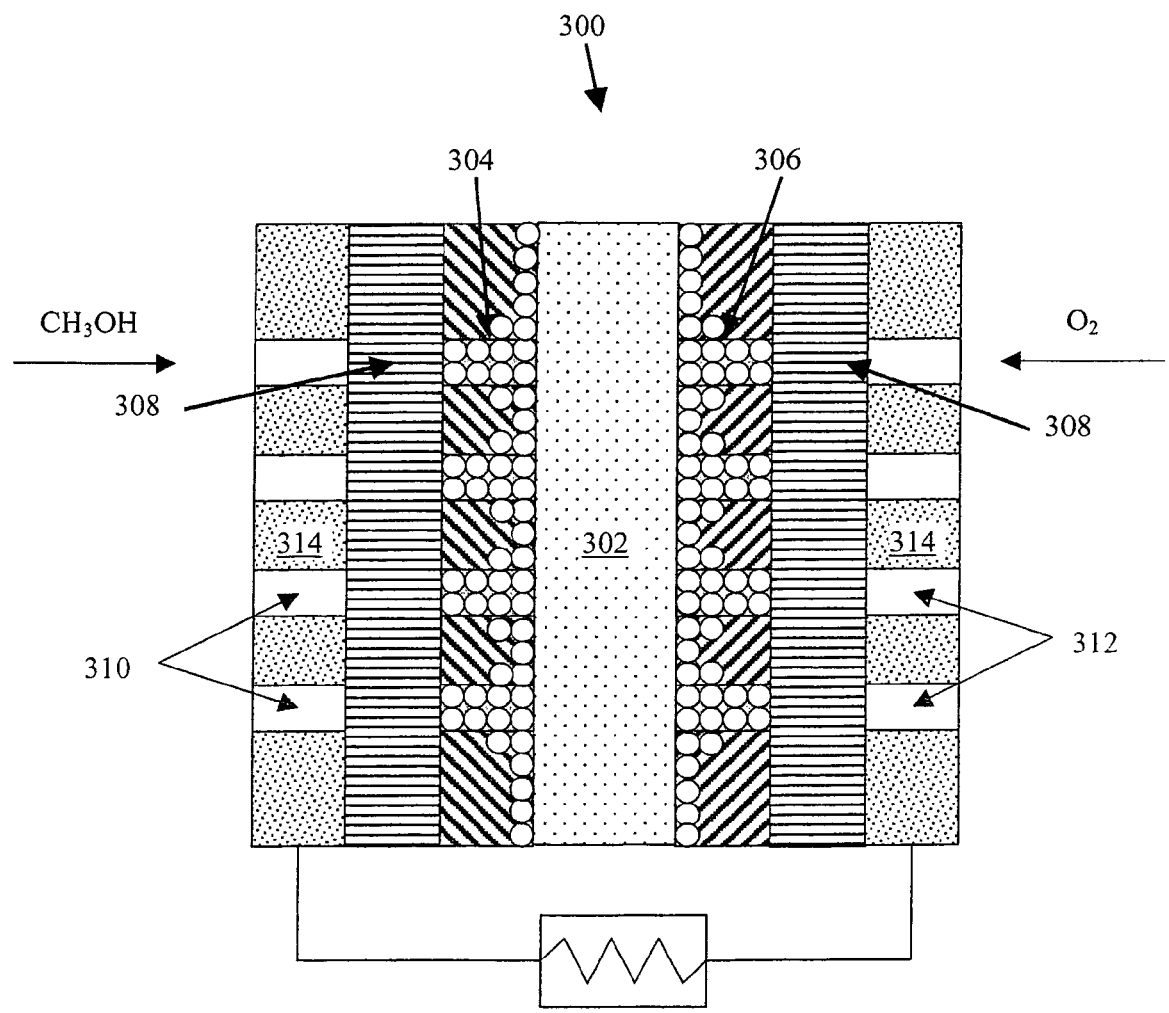
FIG. 3 illustrates a schematic cross-section of a direct methanol fuel cell (DMFC) according to the prior art.

The present invention relates to fuel cell components that incorporate modified carbon products. Specifically, the present invention relates to electrode and electrocatalyst layers that incorporate modified carbon products. The use of such modified carbon products enables the production of electrodes and electrocatalyst layers having enhanced properties. For example, modified carbon products can be utilized in the electrodes (e.g., the anode and cathode) and electrocatalyst layers to enhance catalytic activity, proton and electrode conductivity, and mass transport properties.

As used herein, a modified carbon product refers to a carbon-containing material having an organic group attached to the carbon surface. In a preferred embodiment, the modified carbon product is a carbon particle having an organic group covalently attached to the carbon surface.

A native (unmodified) carbon surface is relatively inert to most organic reactions, and the attachment of specific organic groups at high coverage levels has been difficult. However, U.S. Pat. No. 5,900,029 by Belmont et al., which is incorporated herein by reference in its entirety, discloses a process (referred to herein as the Belmont process) that significantly improves the ability to modify carbon surfaces with organic groups. Utilizing the Belmont process, organic groups can be covalently bonded to the carbon surface such that the groups are highly stable and do not readily desorb from the carbon surface.

Generally, the Belmont process includes reacting at least one diazonium salt with a carbon material to reduce the diazonium salt, such as by reacting at least one diazonium salt with a carbon black in a protic reaction medium. The diazonium salt can include the organic group to be attached to the carbon. The organic group can be selected from an aliphatic group, a cyclic organic group or an organic compound having an aliphatic portion and a cyclic portion. The organic group can be substituted or unsubstituted and can be branched or unbranched. Accordingly, carbon can be modified to alter its properties such as its surface energy, dispersability in a medium, aggregate size and size distribution, dispersion viscosity and/or chemical reactivity.

The modified carbon product can be formed using an electrically conductive crystalline form of carbon, such as graphite, or can be an amorphous carbon. The carbon, whether crystalline or amorphous, can be in the form of any solid carbon, including carbon black, activated carbon, carbon fiber, bulk carbon, carbon cloth, carbon nanotubes, carbon paper, carbon flakes and the like.

It will be appreciated that the carbon material utilized to form the modified carbon product can be selected to suit the specific application of the modified carbon product in which the carbon material will be utilized. For example, graphite has an anisotropic plate-like structure and a well-defined crystal structure, resulting in a high electrical conductivity. In one embodiment, a modified carbon product including graphite is utilized in a fuel cell component to increase or enhance its electrical conductivity.

Carbon fibers are long, thin, rod-shaped structures which are advantageous for physically reinforcing membranes and increasing in-plane electrical conductivity. In one embodiment, modified carbon fibers are utilized in a fuel cell component to increase or maintain its structural integrity.

Carbon blacks are homologous to graphite, but typically have a relatively low conductivity and form soft, loose agglomerates of primarily nano-sized particles that are isotropic in shape. Carbon black particles generally have an average size in the range of 9 to 150 nanometers and a surface area of from about 20 to 1500 m²/g. In one embodiment, a modified carbon product including carbon black is utilized in the fuel cell component to decrease its electrical conductivity. In another embodiment, modified carbon product including carbon black is dispersed in a liquid to form a modified carbon ink that can be utilized in the production of a fuel cell component due to its shape and small particle size.

Generally, a carbon material is modified utilizing the Belmont process via a functionalizing agent of the form:

X—R—Y where:
X reacts with the carbon surface;
R is a linking group; and
Y is a functional group.

The functional group (Y) can vary widely, as can the linking group (R), by selection of the appropriate diazonium salt precursor. The diazonium precursor has the formula:

where:
N is nitrogen;
X is an anion such as Cl⁻, Br⁻ or F⁻; R is the linking group; and
Y is the functional group.

Figure 4:
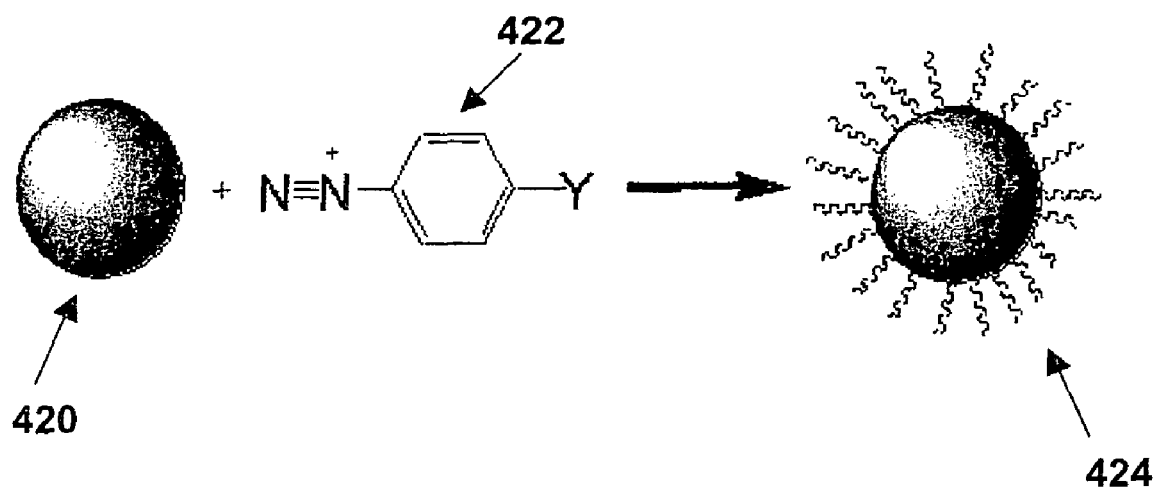
FIG. 4 illustrates a method for modifying a carbon product to form modified carbon according to U.S. Pat. No. 5,900,029 by Belmont et al.

FIG. 4 schematically illustrates one method of surface modifying a carbon material according to the Belmont process. The carbon material 420 is contacted with a diazonium salt 422 to produce a modified carbon product 424. The resulting modified carbon product 424 includes surface groups that include the linking group (R) and the functional group (Y), as discussed below in relation to FIGS. 5(a) and 5(b).

Figure 5A:
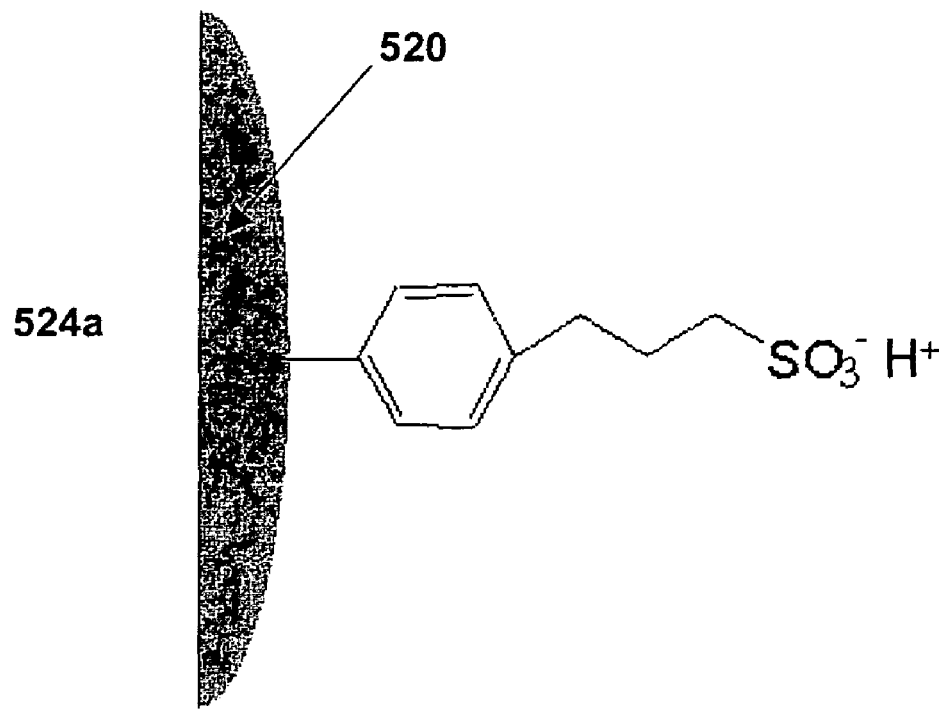
FIG. 5(a) illustrates a functional group attached to a carbon surface via a diazonium salt in accordance with the present invention.
Figure 5B:
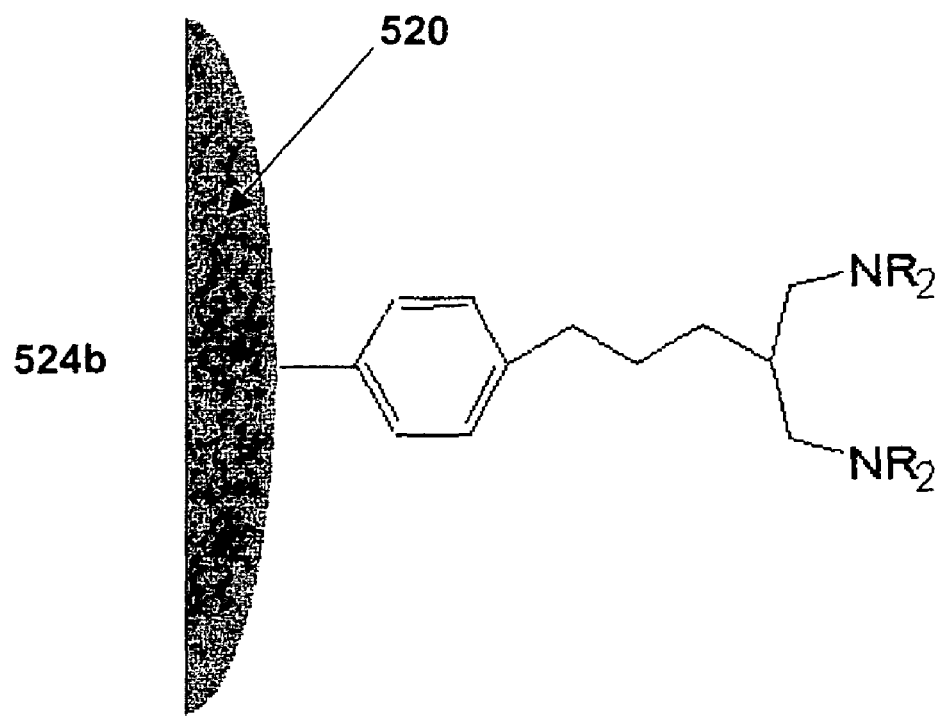
FIG. 5(b) illustrates a functional group attached to a carbon surface via a diazonium salt in accordance with the present invention.

FIGS. 5(a) and 5(b) illustrate different embodiments of a modified carbon product 524a, 524b having a surface group, including a functional group (Y) and linking group (R) attached to the carbon material. In FIG. 5(a), sulfonic acid is attached to the carbon material 520 to produce a modified carbon product 524a. In FIG. 5(b) polyamines are attached to the carbon material 520 to produce a modified carbon product 524b.

Examples of functional groups (Y) that can be used to modify the carbon material according to the present invention include those that are charged (electrostatic), such as sulfonate, carboxylate and tertiary amine salts. Preferred functional groups for fuel cell components according to one aspect of the present invention include those that alter the hydrophobic/hydrophilic nature of the carbon material, such as polar organic groups and groups containing salts, such as tertiary amine salts. Particularly preferred hydrophilic functional groups are listed in Table I, and particularly preferred hydrophobic functional groups are listed in Table II.

TABLE I

| Hydrophilic Functional Groups (Y) | Examples |
| --- | --- |
| Carboxylic acids and salts | $(C_6H_4)CO_2^-K^+$, $(C_6H_4)CO_2H$ |
| Sulfonic acids and salts | $(C_6H_4)CH_2SO_3H$ |
| Phosphonic acids and salts | $(C_{10}H_6)PO_3H_2$ |
| Amines and amine salts | $(C_6H_4)NH_3^+Cl^-$ |
| Alcohols | $(C_6H_4)OH$ |

TABLE II

| Hydrophobic Functional Groups (Y) | Examples |
| --- | --- |
| Saturated and unsaturated cyclics and aliphatics | $(CH_2)_3CH_3$, $(C_6H_4)CH_3$ |
| Halogenated saturated and unsaturated cyclics and aliphatics | $(C_6H_4)CF_3$, $(C_6H_4)(CF_2)_7CF_3$ |
| Polymerics | Polystyrene $[CH_2CH(C_6H_5)]_n$ |

According to another aspect, preferred functional groups for fuel cell components are those that increase proton conductivity, such as $SO_3H$, $PO_3H_2$ and others known to have good proton conductivity. Particularly preferred proton conductive functional groups according to the present invention are listed in Table III.

TABLE III

| Proton Conducting Groups (Y) | Examples |
| --- | --- |
| Carboxylic acid and salt | $(C_6H_4)COOH$, $(C_6H_4)COONa$ |
| Sulfonic acid and salt | $(C_6H_4)SO_3H$, $(C_6H_4)SO_3Na$ |
| Phosphonic acid and salt | $(C_6H_4)PO_3H_2$, $(C_6H_4)PO_3HNa$ |

According to another aspect of the present invention, preferred functional groups for fuel cell components include those that increase steric hindrance and/or physical interaction with other material surfaces, such as branched and unbranched polymeric groups. Particularly preferred polymeric groups according to this aspect are listed in Table IV.

TABLE IV

| Polymeric Groups (Y) | Examples |
| --- | --- |
| Polyacrylate | Polymethyl methacrylate $(C_6H_4)[CH_2C(CH_3)COOCH_2]_n$ |
| Polystyrene | $(C_6H_4)[CH(C_6H_5)CH_2]_n$ |
| Polyethylene oxide (PEO) | $(C_6H_4)[OCH_2CH_2OCH_2CH_2]_n$ |
| Polyethylene glycol (PEG) | $(C_6H_4)[CH_2CH_2O]_n$ |
| Polypropylene oxide (PPO) | $(C_6H_4)[OCH(CH_3)CH_2]_n$ |

The linking group (R) of the modified carbon product can also vary. For example, the linking group can be selected to increase the "reach" of the functional group by adding flexibility and degrees of freedom to further enhance proton conduction, steric hindrance and/or physical interaction with other materials. The linking group can be branched or unbranched. Particularly preferred linking groups according to the present invention are listed in Table V.

TABLE V

| Linking Group (R) | Examples |
| --- | --- |
| Alkyls | $CH_2$, $C_2H_4$ |
| Aryls | $C_6H_4$, $C_6H_4CH_2$ |
| Cyclics | $C_6H_{10}$, $C_5H_4$ |
| Unsaturated aliphatics | $CH_2CH=CHCH_2$ |
| Halogenated alkyl, aryl, cyclics and unsaturated aliphatics | $C_2F_4$, $C_6H_4CF_2$, $C_8F_{10}$ $CF_2CH=CHCF_2$ |

Generally, any functional group (Y) can be utilized in conjunction with any linking group (R) to create a modified carbon product for use according to the present invention. It will be also appreciated that any other organic groups listed in U.S. Pat. No. 5,900,029 by Belmont et al. can be utilized in accordance with the present invention.

It will further be appreciated that the modified carbon product can include varying amounts of surface groups. The amount of surface groups in the modified carbon product is generally expressed either on a mass basis (e.g., mmol of surface groups/gram of carbon) or on a surface area basis (e.g., μmol of surface groups per square meter of carbon material surface area). In the latter case, the BET surface area of the carbon support material is used to normalize the surface concentration per specific type of carbon. In one embodiment, the modified carbon product has a surface group concentration of from about 0.1 μmol/m² to about 6.0 μmol/m². In a preferred embodiment, the modified carbon product has a surface group concentration of from about 1.0 μmol/m² to about 4.5 μmol/m², and more preferably of from about 1.5 μmol/m² to about 3.0 μmol/m².

The modified carbon product can also have more than one functional group and/or linking group attached to the carbon surface. In one such aspect of the present invention, the modified carbon product includes a second functional group (Y') attached to the carbon surface. In one embodiment, the second functional group (Y') is attached to the carbon surface via a first linking group (R), which also has a first functional group (Y) attached thereto. In another embodiment, the second functional group (Y') is attached to the carbon surface via a separate second linking group (R'). In this regard, any of the above referenced organic groups can be attached as the first and/or second organic surface groups, and in any combination.

In one embodiment of the present invention, the modified carbon products are modified carbon product particles having a well-controlled particle size. Preferably, the volume average particle size is not greater than about 100 μm, more preferably is not greater than about 20 μm and even more preferably is not greater than about 10 μm. Further, it is preferred that the volume average particle size is at least about 0.1 μm, more preferably 0.3 μm, even more preferably is at least about 0.5 μm and even more preferably is at least about 1 μm. As used herein, the average particle size is the median particle size ($d_{50}$). Powder batches having an average particle size within the preferred parameters disclosed herein enable the formation of thin layers which are advantageous for producing energy devices such as fuel cells according to the present invention.

In a particular embodiment, the modified carbon product particles have a narrow particle size distribution. For example, it is preferred that at least about 50 volume percent of the particles have a size of not greater than about two times the volume average particle size and it is more preferred that at least about 75 volume percent of the particles have a size of not greater than about two times the volume average particle size. The particle size distribution can be bimodal or trimodal which can advantageously provide improved packing density.

In another embodiment, the modified carbon product particles are substantially spherical in shape. That is, the particles are preferably not jagged or irregular in shape. Spherical particles can advantageously be deposited using a variety of techniques, including direct write deposition, and can form layers that are thin and have a high packing density, as discussed in further detail below.

Manufacture Of Modified Carbon Products Particles

Modified carbon products useful in accordance with the present invention can be manufactured using any known methodology, including, inter alia, the Belmont process, physical adsorption, surface oxidation, sulfonation, grafting, using an alkylating agent in the presence of a Friedel-Crafts type reaction catalyst, mixing benzene and carbon black with a Lewis Acid catalyst under anhydrous conditions followed by polymerization, coupling of a diazotized amine, coupling of one molecular proportion of a tetrazotized benzidine with two molecular proportions of an arylmethyl pyrazolone in the presence of carbon black, use of an electrochemical reduction of a diazonium salt, and those disclosed in and by: Tsubakowa in Polym. Sci., Vol. 17, pp 417-470, 1992, U.S. Pat. No. 4,014,844 to Vidal et al., U.S. Pat. No. 3,479,300 to Riven et al., U.S. Pat. No. 3,043,708 to Watson et al., U.S. Pat. No. 3,025,259 Watson et al., U.S. Pat. No. 3,335,020 to Borger et al., U.S. Pat. No. 2,502,254 to Glassman, U.S. Pat. No. 2,514,236 to Glassman, U.S. Pat. No. 2,514,236 to Glassman, PCT Patent Application No. WO 92/13983 to Centre National De La Recherché Scientifique, and Delmar et al., J. Am. Chem. Soc. 1992, 114, 5883-5884, each of which is incorporated herein by reference in its entirety.

A particularly preferred process for manufacturing modified carbon product particles according to the present invention involves implementing the Belmont process by spray processing, spray conversion and/or spray pyrolysis, the methods being collectively referred to herein as spray processing. A spray process of this nature is disclosed in commonly-owned U.S. Pat. No. 6,660,680 by Hampden-Smith et al., which is incorporated herein by reference in its entirety.

Spray processing according to the present invention generally includes the steps of: providing a liquid precursor suspension, which includes a carbon material and a diazonium salt or a precursor to a diazonium salt; atomizing the precursor to form dispersed liquid precursor droplets; and removing liquid from the dispersed liquid precursor droplets to form the modified carbon product particles.

Preferably, the spray processing method combines the drying of the diazonium salt and carbon-containing droplets and the conversion of the diazonium precursor salt to a linking group and functional group covalently bound to a carbon surface in one step, where both the removal of the solvent and the conversion of the precursor occur essentially simultaneously. Combined with a short reaction time, this method enables control over the properties of the linking group and functional group bound to the carbon surface. In another embodiment, the spray processing method achieves the drying of the droplets in a first step, and the conversion of the diazonium salt to a linking group and functional group in a distinct second step. By varying reaction time, temperature, type of carbon material and type of precursors, spray processing can produce modified carbon product particles having tailored morphologies and structures that yield improved performance.

Spray processing advantageously enables the modified carbon product particles to be formed while the diazonium salt phase is in intimate contact with the carbon surface, where the diazonium salt is rapidly reacted on the carbon surface. Preferably, the diazonium salt is exposed to an elevated reaction temperature for not more than about 600 seconds, more preferably not more than about 100 seconds and even more preferably not more than about 10 seconds.

Spray processing is also capable of forming an aggregate modified carbon product particle structure. The aggregate modified carbon product particles form as a result of the formation and drying of the droplets during spray processing, and the properties of the structure are influenced by the characteristics of the carbon particles, such as the particle size, particle size distribution and surface area of the carbon particles.

Spray processing methods for modified carbon product particle manufacture according to the present invention can be grouped by reference to several different attributes of the apparatus used to carry out the method. These attributes include: the main gas flow direction (vertical or horizontal); the type of atomizer (submerged ultrasonic, ultrasonic nozzle, two-fluid nozzle, single nozzle pressurized fluid); the type of gas flow (e.g., laminar with no mixing, turbulent with no mixing, co-current of droplets and hot gas, countercurrent of droplets and gas or mixed flow); the type of heating (e.g., hot wall system, hot gas introduction, combined hot gas and hot wall, plasma or flame); and the type of collection system (e.g., cyclone, bag house, electrostatic or settling).

For example, modified carbon product particles can be prepared by starting with a precursor liquid including a protic reaction medium (e.g., an aqueous-based liquid), colloidal carbon and a diazonium salt. The processing temperature of the precursor droplets can be controlled so the diazonium salt reacts, leaving the carbon intact but surface functionalized. The precursor liquid may also or alternatively include an aprotic reaction medium such as acetone, dimethyl formamide, dioxane and the like.

The atomization technique has a significant influence over the characteristics of the modified carbon product particles, such as the spread of the particle size distribution (PSD), as well as the production rate of the particles. In extreme cases, some techniques cannot atomize precursor compositions having only moderate carbon particle loading or high viscosities. Several methods exist for the atomization of precursor compositions containing suspended carbon particulates. These methods include, but are not limited to: ultrasonic transducers (usually at a frequency of 1-3 MHz); ultrasonic nozzles (usually at a frequency of 10-150 KHz); rotary atomizers; two-fluid nozzles; and pressure atomizers.

Ultrasonic transducers are generally submerged in a liquid, and the ultrasonic energy produces atomized droplets on the surface of the liquid. Two basic ultrasonic transducer disc configurations, planar and point source, can be used. Deeper fluid levels can be atomized using a point source configuration since the energy is focused at a point that is some distance above the surface of the transducer. The scale-up of submerged ultrasonic transducers can be accomplished by placing a large number of ultrasonic transducers in an array. Such a system is illustrated in U.S. Pat. No. 6,103,393 by Kodas et al. and U.S. Pat. No. 6,338,809 by Hampden-Smith et al., each of which is incorporated herein by reference in its entirety.

Spray nozzles can also be used, and the scale-up of nozzle systems can be accomplished by either selecting a nozzle with a larger capacity, or by increasing the number of nozzles used in parallel. Typically, the droplets produced by nozzles are larger than those produced by ultrasonic transducers. Particle size is also dependent on the gas flow rate. For a fixed liquid flow rate, an increased airflow decreases the average droplet size and a decreased airflow increases the average droplet size. It is difficult to change droplet size without varying the liquid or airflow rates. However, two-fluid nozzles have the ability to process larger volumes of liquid per unit time than ultrasonic transducers.

Ultrasonic spray nozzles use high frequency energy to atomize a fluid and have some advantages over single or two-fluid nozzles, such as the low velocity of the spray leaving the nozzle and lack of associated gas flow. The nozzles are available with various orifice sizes and orifice diameters that allow the system to be scaled for the desired production capacity. In general, higher frequency nozzles are physically smaller, produce smaller droplets, and have a lower flow capacity than nozzles that operate at lower frequencies. A drawback of ultrasonic nozzle systems is that scaling up the process by increasing the nozzle size increases the average particle size. If a particular modified carbon product particle size is required, then the maximum production rate per nozzle is set. If the desired production rate exceeds the maximum production rate of the nozzle, additional nozzles or additional production units will be required to achieve the desired production rate.

The shape of the atomizing surface determines the shape and spread of the spray pattern. Conical, microspray and flat atomizing surface shapes are available. The conical atomizing surface provides the greatest atomizing capability and has a large spray envelope. The flat atomizing surface provides almost as much flow as the conical, but limits the overall diameter of the spray. The microspray atomizing surface is for very low flow rates where narrow spray patterns are needed. These nozzles are preferred for configurations where minimal gas flow is required in association with the droplets.

Particulate suspensions present several problems with respect to atomization. For example, submerged ultrasonic atomizers re-circulate the suspension through the generation chamber and the suspension concentrates over time. Further, some fraction of the liquid atomizes without carrying the suspended carbon particulates. When using submerged ultrasonic transducers, the transducer discs can become coated with the particles over time. Further, the generation rate of particulate suspensions is very low using submerged ultrasonic transducer discs, due in part to energy being absorbed or reflected by the suspended particles.

For spray drying, an aerosol can be generated using three basic methods. These methods differ in the type of energy used to break the liquid masses into small droplets. Rotary atomizers (utilization of centrifugal energy) make use of spinning liquid droplets off of a rotating wheel or disc. Rotary atomizers are useful for co-current production of droplets in the range of 20 to 150 μm in diameter. Pressure nozzles (utilization of pressure energy) generate droplets by passing a fluid under high pressure through an orifice. These can be used for both co-current and mixed-flow reactor configurations, and typically produce droplets in the size range of 50 to 300 μm. Multiple fluid nozzles, such as a two fluid nozzle, produce droplets by passing a relatively slow moving fluid through an orifice while shearing the fluid stream with a relatively fast moving gas stream. As with pressure nozzles, multiple fluid nozzles can be used with both co-current and mixed-flow spray dryer configurations. This type of nozzle can typically produce droplets in the range of 5 to 200 μm.

For example, two-fluid nozzles are used to produce aerosol sprays in many commercial applications, typically in conjunction with spray drying processes. In a two-fluid nozzle, a low-velocity liquid stream encounters a high-velocity gas stream that generates high shear forces to accomplish atomization of the liquid. A direct result of this interaction is that the droplet size characteristics of the aerosol are dependent on the relative mass flow rates of the liquid precursor and nozzle gas stream. The velocity of the droplets as they leave the generation zone can be quite large which may lead to unacceptable losses due to impaction. The aerosol also leaves the nozzle in a characteristic pattern, typically a flat fan, and this may require that the dimensions of the reactor be sufficiently large to prevent unwanted losses on the walls of the system.

The next step in the process includes the evaporation of the solvent (typically water) as the droplet is heated, resulting in a carbon particle of dried solids and salts. A number of methods to deliver heat to the particle are possible: horizontal hot-wall tubular reactors, spray drier and vertical tubular reactors can be used, as well as plasma, flame and laser reactors. As the carbon particles experience either higher temperature or longer time at a specific temperature, the diazonium salt reacts. Preferably, the temperature and amount of time that the droplets/particles experience can be controlled, and, therefore, the properties of the linking group and functional group formed on the carbon surface can also be controlled.

For example, a horizontal, tubular hot-wall reactor can be used to heat a gas stream to a desired temperature. Energy is delivered to the system by maintaining a fixed boundary temperature at the wall of the reactor and the maximum temperature of the gas is the wall temperature. Heat transfer within a hot wall reactor occurs through the bulk of the gas and buoyant forces that occur naturally in horizontal hot wall reactors aid this transfer. The mixing also helps to improve the radial homogeneity of the gas stream. Passive or active mixing of the gas can also increase the heat transfer rate. The maximum temperature and the heating rate can be controlled independent of the inlet stream with small changes in residence time. The heating rate of the inlet stream can also be controlled using a multi-zone furnace.

The use of a horizontal hot-wall reactor according to the present invention is preferred to produce modified carbon product particles with a size of not greater than about 5 μm. One disadvantage of such reactors is the poor ability to atomize carbon particles when using submerged ultrasonics for atomization.

Alternatively, a horizontal hot-wall reactor can be used with a two-fluid nozzle. This method is preferred for precursor feed streams containing relatively high levels of carbon. A horizontal hot-wall reactor can also be used with ultrasonic nozzles, which allows atomization of precursors containing particulate carbons. However, large droplet size can lead to material loss on reactor walls and other surfaces, making this an expensive method for production of modified carbon product particles.

While horizontal hot-wall reactors are useful according to the present invention, spray processing systems in the configuration of a spray dryer are the generally preferred production method for large quantities of modified carbon product particles. Spray drying is a process where particles are produced by atomizing a precursor to produce droplets and evaporating the liquid to produce a dry aerosol, where thermal decomposition of one or more precursors (e.g., a carbon and/or diazonium salt) may take place to produce the particle.

The residence time in the spray dryer is the average time the process gas spends in the drying vessel as calculated by the vessel volume divided by the process gas flow using the outlet gas conditions. The peak excursion temperature (i.e., the reaction temperature) in the spray dryer is the maximum temperature of a particle, averaged throughout its diameter, while the particle is being processed and/or dried. The droplets are heated by supplying a pre-heated carrier gas.

Three types of spray dryer systems are useful for spray drying to form modified carbon product particles according to the present invention. An open system is useful for general spray drying to form modified carbon product particles using air as an aerosol carrier gas and an aqueous feed solution as a precursor. A closed system is useful for spray drying to form modified carbon product particles using an aerosol carrier gas other than air. A closed system is also useful when using a non-aqueous or a semi-non-aqueous solution as a precursor. A semi-closed system, including a self-inertizing system, is useful for spray drying to form modified carbon product particles that require an inert atmosphere and/or precursors that are potentially flammable.

Two spray dryer designs are particularly useful for the production of modified carbon product particles according to the present invention. A co-current spray dryer is useful for production of modified carbon product particles that are sensitive to high temperature excursions (e.g., greater than about 350° C.), or that require a rotary atomizer to generate the aerosol. Mixed-flow spray dryers are useful for producing modified carbon product particles that require relatively high temperature excursions (e.g., greater than about 350° C.), or require turbulent mixing forces. According one embodiment of the present invention, co-current spray-drying is preferred for the manufacture of modified carbon product particles, including modified carbon black.

In a co-current spray dryer, the hot gas is introduced at the top of the unit, where the droplets are generated with any of the above-described atomization techniques. Generally, the maximum temperature that a droplet/particle is exposed to in a co-current spray dryer is the temperature at the outlet of the dryer. Typically, this outlet temperature is limited to about 200° C., although some designs allow for higher temperatures. In addition, since the particles experience the lowest temperature in the beginning of the time-temperature curve and the highest temperature at the end, the possibility of precursor surface diffusion and agglomeration is high.

A mixed-flow spray dryer introduces the hot gas at the top of the unit while precursor droplets are generated near the bottom and directed upwardly. The droplets/particles are forced towards the top of the unit, and then fall and flow back down with the gas, increasing the residence time in the spray dryer. The temperature experienced by the droplets/particles is higher compared to a co-current spray dryer.

These conditions are advantageous for the production of modified carbon product particles having a wide range of surface group concentrations including surface concentrations up to 6 $\mu mol/m^2$ organic groups on carbon. For co-current spray dryers the reaction temperatures can be high enough to enable reaction of the diazonium salt (e.g., between 25° C. and 100° C.). The highest temperature in co-current spray dryers is the inlet temperature (e.g., 180° C.), and the outlet temperature can be as low as 50° C. Therefore, the carbon particles and surface groups reach the highest temperature for a relatively short time, which advantageously reduces migration or surface diffusion of the surface groups. This spike of high temperature can also quickly convert the diazonium salt to the bonded surface group, and is followed by a mild quench since the spray dryer temperature quickly decreases after the maximum temperature is achieved. Thus, the spike-like temperature profile can be advantageous for the generation of highly dispersed surface groups on the surface of the carbon.

The range of useful residence times for producing modified carbon product particles depends on the spray dryer design type, atmosphere used, nozzle configuration, feed liquid inlet temperature and the residual moisture content. In general, residence times for the production of modified carbon product particles can range from less than 3 seconds up to 5 minutes.

For a co-current spray-drying configuration, the range of useful inlet temperatures for producing modified carbon product particles depends on a number of factors, including solids loading and droplet size, atmosphere used and energy required to perform drying and/or reaction of the diazonium salt. Useful inlet temperatures should be sufficiently high to accomplish the drying and/or reaction of the diazonium salt without promoting significant surface diffusion of the surface groups.

In general, the outlet temperature of the spray dryer determines the residual moisture content of the modified carbon product particles. For example, a useful outlet temperature for co-current spray drying according to one embodiment of the present invention is from about 50° C. to about 80° C. Useful inlet temperatures according to the present invention are from about 130° C. to 180° C. The carbon solids (e.g., particulate) loading can be up to about 50 wt. %.

Other equipment that is desirable for producing modified carbon product particles using a spray dryer includes a heater for heating the gas, directly or indirectly, including by thermal, electrical conductive, convective and/or radiant heating. Collection apparatus, such as cyclones, bag/cartridge filters, electrostatic precipitators, and/or various wet collection apparatus, may also be utilized to collect the modified carbon product particles.

In one embodiment of the present invention, spray drying is used to form aggregate modified carbon product particles, wherein the aggregates include more than one modified carbon product particle. In this regard, the individual modified carbon product particles can all have essentially the same surface groups or varying types of modified carbon product particles can be utilized to provide an aggregate with a mixture of surface groups. For example, a first modified carbon product particle within the aggregate can have a hydrophilic surface group and a second modified carbon product particle can have a hydrophobic surface group.

In one aspect, first modified carbon product particles (e.g., modified carbon black particles having a hydrophilic surface group) and second modified carbon product particles (e.g., modified carbon black particles having a hydrophobic surface group) are dispersed in a aqueous precursor solution and spray dried to obtain an aggregate modified carbon product particle having both hydrophilic and hydrophobic properties. The aggregate may include various particle sizes, from nano-sized particles to large, sub-micron size particles.

Moreover, as described below with respect to electrocatalyst materials, the aggregate structure can include smaller primary carbon particles and two or more types of primary particles can be mixed. For example, two or more types of particulate carbon (e.g., amorphous and graphitic carbon) can be combined within the aggregate to tailor the aggregate to the desired electrical and/or oxidation resistant properties.

In this regard, spray drying techniques can be used simply to form the aggregate modified carbon product particles, or to additionally effect a change in the structure of the individual modified carbon product particles. For example, spray processing techniques can be conducted at higher temperatures to effect at least a partial decomposition of the previously attached surface groups, such as those surface groups that are utilized to help the spray processing, but are subsequently not desired in the end-product. The specific temperature for the spray drying process may be chosen depending on the desired outcome, which is a function of the type and stability of the surface groups, the targeted final composition, and the treatment distribution.

Electrocatalyst Materials

Electrocatalysts are used in the fuel cell to facilitate the desired reactions. Particularly preferred electrocatalyst materials useful in accordance with the present invention include those having an active species phase, such as a metal, dispersed on a support phase, such as a carbon material. Such electrocatalyst materials are described in U.S. Pat. No. 6,660,680 by Hampden-Smith et al. As used herein, the terms "electrocatalyst materials", "electrocatalyst particles" and/or "electrocatalyst powders" and the like refer to such electrocatalyst materials in a non-modified native state.

With respect to electrocatalyst materials, the larger structures formed from the association of discrete carbon particles supporting the dispersed active species phase are referred to as aggregates or aggregate particles, and typically have a size in the range from 0.3 to 100 mm. In addition, the aggregates can further associate into larger "agglomerates". The aggregate morphology, aggregate size, size distribution and surface area of the electrocatalyst powders are all characteristics that impact the catalyst performance. The aggregate morphology, aggregate size and size distribution determines the packing density, and the surface area determines the type and number of surface adsorption centers where the active species form during synthesis of the electrocatalyst.

The aggregate structure can include smaller primary carbon particles, constituting the support phase. Two or more types of primary particles can be mixed to form the support phase. For example, two or more types of particulate carbon (e.g., amorphous and graphitic carbon) can be combined to form the support phase. The two types of particulate carbon can have different performance characteristics and the combination of the two types in the aggregate structure can enhance the performance of the catalyst.

The carbon support is a major component of the electrocatalysts. To achieve adequate dispersion of the active sites, the carbon support should have a high surface area, a large accessible porous surface area (pore sizes from about 2 nm to about 50 nm preferred), low levels of contaminants that are poisons for either the membrane or the active sites during long term operation of the fuel cell, and good stability with respect to oxidation during the operation of the fuel cell.

Among the forms of carbon available for the support phase, graphitic carbon is preferred for long-term operational stability of fuel cells due to its ability to resist oxidation. Amorphous carbon (e.g., carbon black) is preferred when a smaller crystallite size is desired for the supported active species phase. The carbon support particles typically have sizes in the range of from about 10 nanometers to 5 µm, depending on the nature of the carbon material. However, carbon particulates having sizes up to 25 µm can also be used.

The compositions and ratios of the aggregate particle components can be independently varied, and various combinations of carbons, metals, metal alloys, metal oxides, mixed metal oxides, organometallic compounds and their partial pyrolysis products can be used. The electrocatalyst particles can include two or more different materials as the dispersed active species. As an example, combinations of Ag and $MnO_x$ dispersed on carbon can be useful for some electrocatalytic applications. Other examples of multiple active species are mixtures of metal porphyrins, partially decomposed metal porphyrins, Co and CoO.

The supported electrocatalyst particles preferably include a carbon support phase with at least about 1 weight percent active species phase, more preferably at least about 5 weight percent active species phase and even more preferably at least about 10 weight percent active species phase. In one embodiment, the particles include from about 20 to about 80 weight percent of the active species phase dispersed on the support phase. It has been found that such compositional levels give rise to the most advantageous electrocatalyst properties for many applications. However, the preferred level of the active species supported on the carbon support will depend upon the total surface area of the carbon, the type of active species phase and the application of the electrocatalyst. A carbon support having a low surface area will require a lower percentage of active species on its surface to achieve a similar surface concentration of the active species compared to a support with higher surface area and higher active species loading.

Metal-carbon electrocatalyst particles include a catalytically active species of at least a first metal phase dispersed on a carbon support phase. The metal active species phase can include any metal and the particularly preferred metal will depend upon the application of the powder. The metal phase can be a metal alloy wherein a first metal is alloyed with one or more alloying elements. As used herein, the term metal alloy also includes intermetallic compounds between two or more metals. For example, the term platinum metal phase refers to a platinum alloy or platinum-containing intermetallic compound, as well as pure platinum metal. The metal-carbon electrocatalyst powders can also include two or more metals dispersed on the support phase as separate active species phases.

Preferred metals for the active species include the platinum group metals and noble metals, particularly Pt, Ag, Pd, Ru, Os and their alloys. The metal phase can also include a metal selected from the group consisting of Ni, Rh, Ir, Co, Cr, Mo, W, V, Nb, Al, Ta, Ti, Zr, Hf, Zn, Fe, Cu, Ga, In, Si, Ge, Sn, Y, La, lanthanide metals and combinations or alloys of these metals. Preferred metal alloys include alloys of Pt with other metals, such as Ru, Os, Cr, Ni, Mn and Co. Particularly preferred among these is Pt or PtRu for use in the anode and Pt, PtCrCo or PtNiCo for use in the cathode.

Alternatively, metal oxide-carbon electrocatalyst particles that include a metal oxide active species dispersed on a carbon support phase can be used. The metal oxide can be selected from the oxides of the transition metals, preferably those existing in oxides of variable oxidation states, and most preferably from those having an oxygen deficiency in their crystalline structure. For example, the metal oxide active species can be an oxide of a metal selected from the group consisting of Au, Ag, Pt, Pd, Ni, Co, Rh, Ru, Fe, Mn, Cr, Mo, Re, W, Ta, Nb, V, Hf, Zr, Ti or Al. A particularly preferred metal oxide active species is manganese oxide ($MnO_x$ where x is 1 to 2). The active species can include a mixture of different oxides, solid solutions of two or more different metal oxides or double oxides. The metal oxides can be stoichiometric or non-stoichiometric and can be mixtures of oxides of one metal having different oxidation states. The metal oxides can also be amorphous.

It is preferred that the average size of the active species is such that the electrocatalyst particles include small single crystals or crystallite clusters, collectively referred to herein as clusters, of the active species dispersed on the support phase. Preferably, the average active species cluster size (diameter) is not greater than about 10 nanometers, more preferably is not greater than about 5 nanometers and even more preferably is not greater than about 3 nanometers. Preferably, the average cluster size of the active species is from about 0.5 to 5 nanometers. Preferably, at least about 50 percent by number, more preferably at least about 60 percent by number and even more preferably at least about 70 percent by number of the active species phase clusters have a size of not greater than about 3 nanometers. Electrocatalyst powders having a dispersed active species phase with such small crystallite clusters advantageously have enhanced catalytic properties as compared to powders including an active species phase having larger clusters.

It should be recognized that the preferred electrocatalyst powders are not mere physical admixtures of different particles, but are comprised of support phase particles that include a dispersed phase of an active species. Preferably, the composition of the aggregate electrocatalyst particles is homogeneous. That is, the different phases of the electrocatalyst are well dispersed within a single aggregate particle. It is also possible to intentionally provide compositional gradients within the individual electrocatalyst aggregate particles. For example, the concentration of the dispersed active species phase in a composite particle can be higher or lower at the surface of the secondary support phase than near the center and gradients corresponding to compositional changes of 10 to 100 weight percent can be obtained. When the aggregate particles are deposited using a direct-write tool, the aggregate particles preferably retain their structural morphology and therefore the functionality of the compositional gradient can be exploited in the device.

In addition, the electrocatalyst powders preferably have a surface area of at least about 25 m$^2$/g, more preferably at least about 90 m$^2$/g and even more preferably at least about 600 m$^2$/g. Surface area is typically measured using the BET nitrogen adsorption method which is indicative of the surface area of the powder, including the surface area of accessible pores on the surface of the particles.

Moreover, many of the desired attributes of modified carbon products may be desired attributes of electrocatalyst, and any of the above-described attributes of the modified carbon products can be acknowledged as being useful in the production, use and application of electrocatalyst materials. For example, particle size, size distribution and spherical nature can be an important factor when utilizing such electrocatalyst materials in an electrocatalyst ink, as described in further detail below.

Manufacture of Electrocatalyst Materials

Electrocatalyst materials may be produced in a variety of ways including impregnation and co-precipitation. One preferred method for preparing particulate electrocatalyst materials is by spray processing, one approach of which is disclosed in U.S. Pat. No. 6,660,680 to Hampden-Smith et al.

Production of electrocatalyst material by spray processing generally involves the steps of: providing a precursor composition which includes a support phase or a precursor to the support phase (e.g., a carbon-containing material) and a precursor to the active species; atomizing the precursor to form a suspension of liquid precursor droplets; and removing liquid from liquid precursor droplets to form the powder. At least one component of the liquid precursor is chemically converted into a desired component of the powder. The drying of the precursors and the conversion to a catalytically active species can be combined in one step, where both the removal of the solvent and the conversion of a precursor to the active species occur essentially simultaneously. Combined with a short reaction time, this enables control over the distribution of the active species on the support, the oxidation state of the active species and the crystallinity of the active species. By varying reaction time, temperature, type of support material and type of precursors, electrocatalyst materials having well-controlled catalyst morphologies and active species structures can be produced, which yield improved catalytic performance.

The precursor composition can include low temperature precursors, such as a molecular metal precursor that has a relatively low decomposition temperature. As used herein, the term molecular metal precursor refers to a molecular compound that includes a metal atom. Examples include organometallics (molecules with carbon-metal bonds), metal organics (molecules containing organic ligands with metal bonds to other types of elements such as oxygen, nitrogen or sulfur) and inorganic compounds such as metal nitrates, metal halides and other metal salts. The molecular metal precursors can be either soluble or insoluble in the precursor composition.

In general, molecular metal precursor compounds that eliminate ligands by a radical mechanism upon conversion to metal are preferred, especially if the species formed are stable radicals, and, therefore, lower the decomposition temperature of that precursor compound.

Furthermore, molecular metal precursors containing ligands that eliminate cleanly upon precursor conversion are preferred because they are not susceptible to carbon contamination or contamination by anionic species such as nitrates. Therefore, preferred precursors for metals include carboxylates, alkoxides or combinations thereof that convert to metals, metal oxides or mixed metal oxides by eliminating small molecules such as carboxylic acid anhydrides, ethers or esters.

Particularly preferred molecular metal precursor compounds are metal precursor compounds containing silver, nickel, platinum, gold, palladium, copper, ruthenium, cobalt and chromium. In one preferred embodiment of the present invention, the molecular metal precursor compound comprises platinum.

Various molecular metal precursors can be used for platinum metal. Preferred molecular precursors for platinum include nitrates, carboxylates, beta-diketonates, and compounds containing metal-carbon bonds. Divalent platinum (II) complexes are particularly preferred. Preferred molecular precursors also include ammonium salts of platinates such as ammonium hexachloro platinate $(NH_4)_2PtCl_6$, and ammonium tetrachloro platinate $(NH_4)_2PtCl_4$; sodium and potassium salts of halogeno, pseudohalogeno or nitrito platinates such as potassium hexachloro platinate $K_2PtCl_6$, sodium tetrachloro platinate $Na_2PtCl_4$, potassium hexabromo platinate $K_2PtBr_6$, potassium tetranitrito platinate $K_2Pt(NO_2)_4$; dihydrogen salts of hydroxo or halogeno platinates such as hexachloro platinic acid $H_2PtCl_6$, hexabromo platinic acid $H2PtBr_6$, dihydrogen hexahydroxo platinate $H_2Pt(OH)_6$; diammine and tetraammine platinum compounds such as diammine platinum chloride $Pt(NH_3)_2Cl_2$, tetraammine platinum chloride $[Pt(NH_3)_4]Cl_2$, tetraammine platinum hydroxide $[Pt(NH_3)_4](OH)_2$, tetraammine platinum nitrite $[Pt(NH_3)_4](NO_2)_2$, tetrammine platinum nitrate $Pt(NH_3)_4(NO_3)_2$, tetrammine platinum bicarbonate $[Pt(NH_3)_4](HCO_3)_2$, tetraammine platinum tetrachloroplatinate $[Pt(NH_3)_4]PtCl_4$; platinum diketonates such as platinum (II) 2,4-pentanedionate $Pt(C_5H_7O_2)_2$; platinum nitrates such as dihydrogen hexahydroxo platinate $H_2Pt(OH)_6$ acidified with nitric acid; other platinum salts such as Pt-sulfite and Pt-oxalate; and platinum salts comprising other N-donor ligands such as $[Pt(CN)_6]_4^+$.

Modified Electrocatalyst Products

According to one embodiment of the present invention, the modified electrocatalyst products are a subclass of the above-described modified carbon products, and as used herein, modified electrocatalyst products generally refers to an electrocatalyst material having an organic group attached thereto.

In one embodiment of the present invention, a modified electrocatalyst product is provided having an active species phase, a carbon support phase, and an organic surface group covalently bonded to the carbon support phase.

In one preferred embodiment, the active species phase includes a first metal, such as platinum. The active species phase can also include a second metal, such as ruthenium, cobalt, chromium or nickel. The first and second metals can be in metallic, metal oxide or alloy form, as described in further detail below. In yet another embodiment, the active species phase includes at least three metals (e.g., Pt, Ni and Co). The active species phase may be any of the above-mentioned metals or metal oxides utilized in the above-described electrocatalyst materials.

The carbon support material can be any of the above-described materials utilized in a modified carbon product or electrocatalyst material. In one preferred embodiment, the carbon support material is carbon black.

The organic group may include aliphatic groups, cyclic organic groups and organic compounds having an aliphatic portion and a cyclic portion. The organic group can be substituted or unsubstituted and can be branched or unbranched. Generally, as described above, the organic groups include a linking group (R) and a functional group (Y), more generally known as surface groups.

Any of the above-described functional groups (Y) utilized to form a modified carbon product can also be used in the production of a modified electrocatalyst product, including those that are charged (electrostatic), such as sulfonate, carboxylate and tertiary amine salts. Preferred functional groups include those that alter the hydrophobic or hydrophilic nature of the carbon material, such as polar organic groups and groups containing salts, such as tertiary amine salts, including those listed in Tables I and II. Another particularly preferred class of functional groups include those that increase proton conductivity, such as $SO_3H$, $PO_3H_2$ and others known to be part of the backbone of a proton conducting membrane, including those listed in Table III. Yet another particularly preferred class of functional groups includes compounds that increase steric hindrance and/or physical interaction with other material surfaces, such as such as those listed in Table IV.

Any of the linking groups (R) utilized in the creation of a modified carbon product can also be used in the production of a modified electrocatalyst products, including those that increase the "reach" of the functional group by adding flexibility and degrees of freedom to further increase, for example, proton conduction, steric hindrance and/or physical and/or interaction with other materials, including branched and unbranched materials. Particularly preferred linking groups are listed in Table V, above.

It will be appreciated that, generally, any functional group (Y) can be utilized in conjunction with any linking group (R) to create a modified electrocatalyst product according to the present invention to produce the desired effect within the fuel cell component. It will be also appreciated that any other organic groups disclosed in U.S. Pat. No. 5,900,029 by Belmont et al. can be utilized.

As noted above, modified electrocatalyst products are a subclass of modified carbon products. Thus, many of the desired attributes of modified carbon products are also desired attributes of modified electrocatalyst products, and any of the above-described attributes of modified carbon products can be acknowledged as being useful in the production, use and application of modified electrocatalyst products. For example, particle size, size distribution and spherical nature can be an important factor when utilizing such modified electrocatalyst products in a modified carbon ink, as described in further detail below. Moreover, many of the attributes of electrocatalyst materials are also desired attributes of modified electrocatalyst products and any of the above-described attributes of electrocatalyst materials can be acknowledged as being useful in the production, use and application of modified electrocatalyst products. For example, surface area, average active species cluster size and size distribution, mass ratio of active species phase to carbon support phase, and particle aggregation are important factors in catalytic activity. Other attributes are described below.

The modified electrocatalyst product may include varying concentrations of functional groups, such as from about 0.1 $\mu mol/m^2$ to about 6.0 $\mu mol/m^2$. In a preferred embodiment, the modified electrocatalyst product has a surface group concentration of from about 1.0 $\mu mol/m^2$ to about 4.5 $\mu mol/m^2$, and more preferably of from about 1.5 $\mu mol/m^2$ to about 3.0 $\mu mol/m^2$.

The modified electrocatalyst product may also have more than one functional group and/or linking group attached to the carbon material. In one aspect of the present invention, the modified electrocatalyst product includes a second organic surface group having a second functional group (Y') attached to the carbon support. In one embodiment, the second functional group (Y') can be attached to the carbon support via a first linking group (R), which also has the first functional group (Y) attached thereto. Alternatively, the second functional group (Y') can be attached to the carbon support phase via a separate second linking group (R'). In this regard, any of the above referenced organic groups can be attached as the first and/or second organic surface groups, and in any combination.

In a particular embodiment, the first organic surface group includes a first proton conductive functional group, such as a sulfuric and/or carboxylic group, and the second organic surface group includes a second proton conductive functional group, such as a phosphoric group. The use of two different proton conducting functional groups on the same carbon material is useful in circumstances where a wide range of operating conditions may be utilized so one of the proton conducting groups is always functional. This enables a relatively flat rate of proton conduction over a wide range of operating conditions. For example, sulfuric groups are known to fail at temperatures of about 100° C. However, phosphoric groups are capable of conducting protons at temperatures above 100° C. Thus, utilizing a modified carbon product having two different proton conducting functional groups can enable proton conduction over a wide range of temperatures without requiring the incorporation of numerous raw proton conducting materials in the fuel cell component. Such materials are especially useful in fuel cells utilized in automobiles and other transportation devices where temperatures can widely vary during start-up conditions.

Methods of producing modified electrocatalyst products are described in further detail below. It will be appreciated that many of such methods can be utilized to produce a modified electrocatalyst product having first and second organic surface groups attached thereto. Preferred methods for producing modified electrocatalyst products having two different types of organic surface group attached thereto (a multiply-modified electrocatalyst product) include spray processing and surface contacting techniques, such as immersion and spraying.

In one embodiment, a multiply-modified electrocatalyst product having first and second organic surface groups is produced by spray processing, where a diazonium salt and modified electrocatalyst product having a first organic surface group attached thereto are included in a precursor composition. The precursor composition is subsequently spray processed to attach a second organic group to the carbon support to produce the multiply-modified electrocatalyst product. The multiply-modified electrocatalyst product may then be utilized in the production of a fuel cell component.

In another embodiment, a multiply-modified electrocatalyst product having first and second organic surface groups is produced by placing a modified electrocatalyst product having a first organic surface group attached thereto in a solution comprising a diazonium salt having a second organic group. The second organic group from the diazonium salt will attach to the carbon support to create the multiply-modified electrocatalyst product. The multiply-modified electrocatalyst product may then be utilized in the production of a fuel cell component.

It will be appreciated, that the multiply-modified electrocatalyst product can be formed by modifying with the second organic surface group before or after the multiply-modified electrocatalyst product is incorporated into a component of the fuel cell. For example, a modified electrocatalyst product can be utilized in the production of a fuel cell component. Subsequently, the modified electrocatalyst product can be contacted by a diazonium salt to attach the second organic surface group.

In a particular embodiment, a modified electrocatalyst product can be utilized in the production of an electrode. Subsequently, the electrode can be contacted with a second diazonium salt, such as by immersion and/or spraying, to attach the second organic surface group.

Manufacture of Modified Electrocatalyst Products

Modified electrocatalyst products according to the present invention can be manufactured by any appropriate method, including Impregnation, co-precipitation and other methods utilized by those skilled in the art to make supported electrocatalysts. One preferred method for manufacturing modified electrocatalyst products is spray processing, as described above in reference to modified carbon particles.

When a non-modified carbonaceous material is utilized in a spray processing precursor composition, a dispersant, such as a surfactant, is typically required to enable dispersion and increased loading of the carbonaceous material. Such dispersants typically require high temperature processing to facilitate their removal from the resultant products. Moreover, in the production of electrocatalyst materials, any unremoved dispersants typically poison the active sites.

However, according to the present invention, modified carbon products having surface groups that match the polar or non-polar nature of the precursor liquid composition can be used. Such modified carbon products decrease or eliminate the need for such dispersants as the modified carbon products may be more readily dispersed in the precursor composition. Utilizing modified carbon products may also lower spray processing manufacturing temperatures. Processing at a lower temperature also enables reduction of the active species crystallite size in the electrocatalyst.

Figure 6:
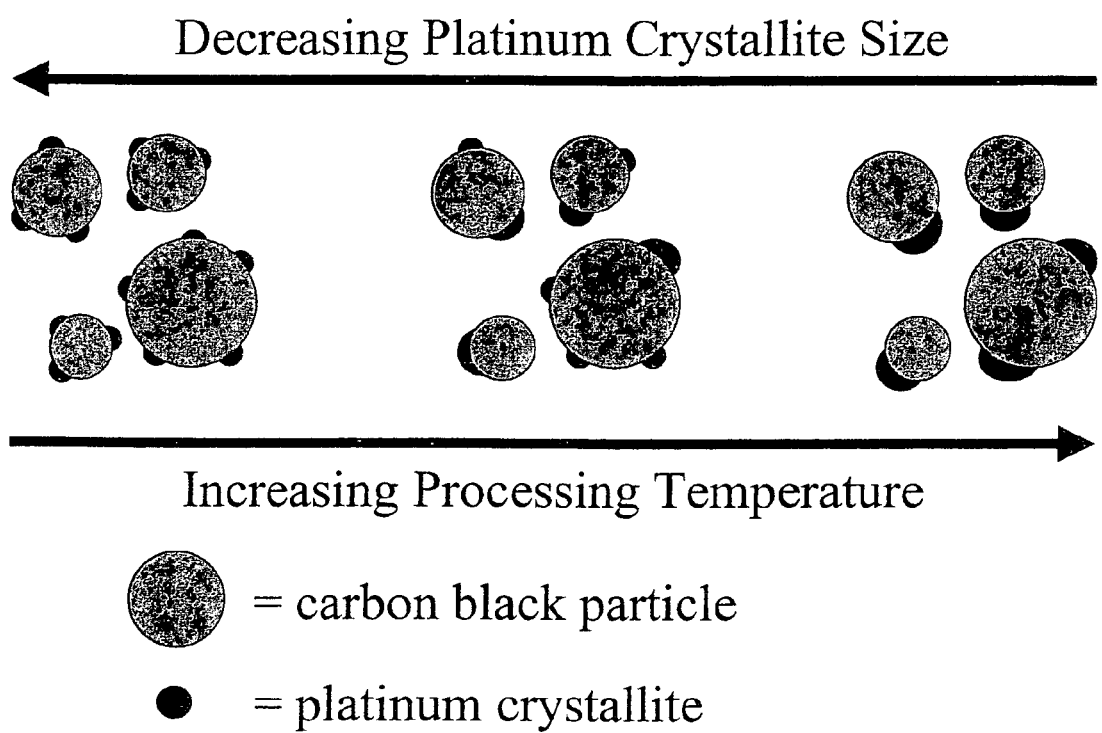
FIG. 6 illustrates the increase in active species phase size as processing temperature increases.
Figure 7:
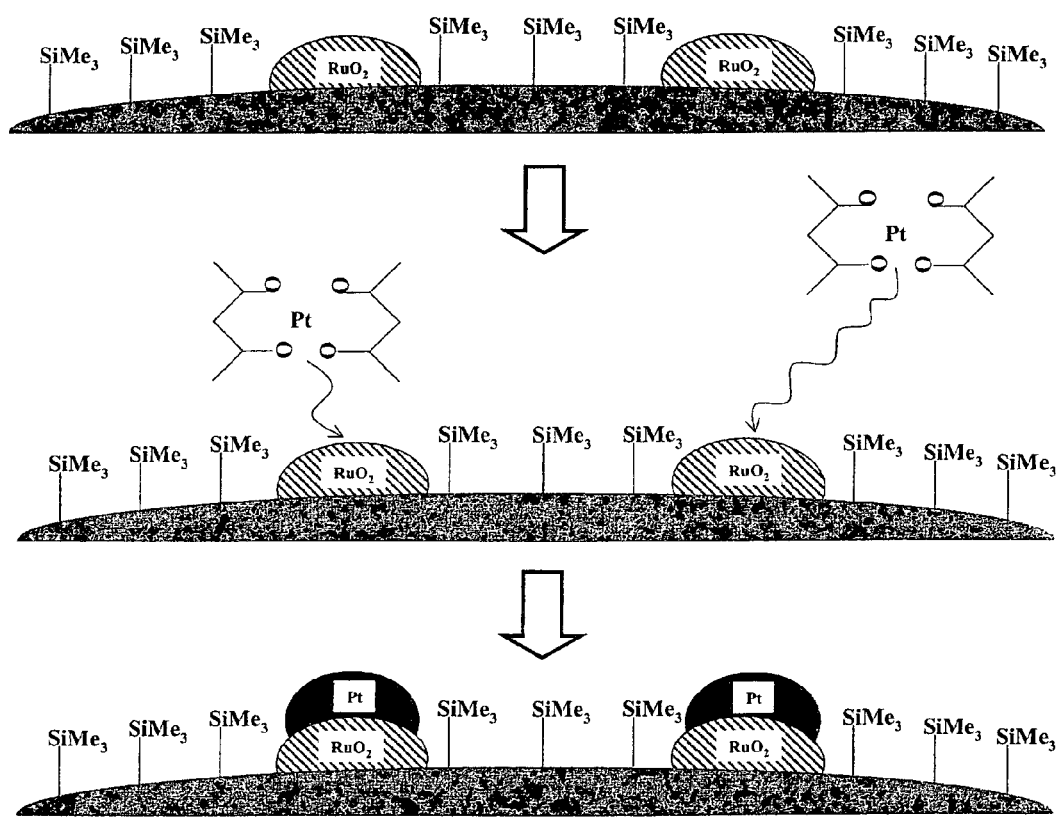
FIG. 7 illustrates a method for formation of platinum/metal oxide active sites using a modified carbon product according to the present invention.

As schematically depicted in FIG. 6, and with specific reference to platinum as the active species phase and carbon black as the carbon material, as processing temperature increases, as depicted left to right in the figure, crystallite size increases. Conversely, as temperature decreases, crystallite size also decreases. Reduced crystallite sizes at lower temperatures are also evidenced due to the decreased ability for the active species phase (e.g., platinum) to migrate during the production temperature.

An increased dispersability of the carbon material in the precursor composition also enables an expanded range of carbon products (e.g., graphite) and metal precursors that can be used. Other materials that may be added to the precursor composition include those that do not decompose during processing, such as ionomers (e.g., PTFE) and molecular species (e.g., metal porphryns).

Thus, one approach of the present invention is directed to the production of modified electrocatalyst particles by spray processing utilizing a modified carbon product in the precursor composition. According to one particular aspect, modified electrocatalyst products are produced utilizing spray processing, where the precursor composition includes modified carbon product particles as the support phase and a precursor to the active species.

Preferred modified carbon products useful in accordance with this aspect include those that are miscible in an aqueous precursor composition, including those having polar surface groups, such as those terminating in hydrophilic and/or proton conducting functional groups as listed in Tables I and III, above. Preferred modified carbon products useful in accordance with the present aspect also include those that are miscible in a non-aqueous precursor composition, including those having non-polar surface groups, such those terminating in hydrophobic functional groups as those listed in Table II above. Preferred modified carbon products useful in accordance with this aspect also include those that are readily atomizable to produce an aerosol comprising the modified carbon product.

In a particularly preferred embodiment, the modified carbon product used in the precursor composition is a low-conductivity carbon material (e.g., a carbon black) having a hydrophilic surface group (e.g., a sulfuric terminating functional group). In a particular embodiment, the precursor solution includes from about 5 weight percent to about 15 weight percent of the modified carbon product.

Preferred active species precursors include those listed above for the production of non-modified electrocatalyst materials, including molecular metal precursor compounds, such as organometallics (molecules with carbon-metal bonds), metal organics (molecules containing organic ligands with metal bonds to other types of elements such as oxygen, nitrogen or sulfur) and inorganic compounds such as metal nitrates, metal halides and other metal salts. The molecular metal precursors can be either soluble or insoluble in the precursor composition.

Particularly preferred molecular metal precursor compounds are metal precursor compounds containing nickel, platinum, ruthenium, cobalt and chromium. In one preferred embodiment of the present invention, the molecular metal precursor compound comprises platinum.

Various molecular metal precursors can be used for platinum metal, such as those described above with reference to the molecular metal precursors utilized in the production of electrocatalyst materials. Any known molecular metal precursors can also be utilized for other metals, including molecular metal precursors of ruthenium, nickel, cobalt and chromium. Preferred precursors for ruthenium include ruthenium (III) nitrosyl nitrate [$Ru(NO)NO_3$)] and ruthenium chloride hydrate. One preferred precursor for nickel is nickel nitrate [($Ni(NO_3)_2$]. One preferred precursor for cobalt is cobalt nitrate [Co(No$_3$)$_2$]. One preferred precursor for chromium is chromium nitrate [Cr(NO$_3$)$_3$].

In accordance with this aspect, low temperature spray processing conditions can be utilized to produce a modified electrocatalyst product. The processing temperature within the spray processor is preferably less than about 500° C., more preferably les than 400° C., and even more preferably less than 300° C., The residence time within the spray processor is preferably less than about 10 seconds, more preferably less than 5 seconds, and even more preferably less than 3 seconds.

In another embodiment, the precursor composition comprises previously manufactured electrocatalyst materials, such as any of those described above, and a diazonium salt or a diazonium salt precursor. The above-described spray processing methods can be utilized to produce a modified electrocatalyst product based on this precursor composition.

In another aspect of the present invention, spray generation methods are utilized in conjunction with a precursor composition including a modified carbon product to generate an aerosol for use in the spray processing methods. As noted above, dispersants, such as surfactants, have previously been utilized to enable spray processing of non-modified carbon material. Surfactants increase the viscosity and change the surface tension, disallowing the use of certain generation methods like ultrasonic nebulization. In one embodiment, a precursor composition including modified carbon products and/or modified electrocatalyst products is utilized in a spray processing method to produce a modified carbon product, wherein the precursor composition is atomized utilizing ultrasonic generation, a vibrating orifice or spray nozzles.

Formation of Alloyed, Mixed Metal and/or Metal Oxide Modified Electrocatalyst Products Another aspect of the present invention is directed to the use of modified carbon products to produce modified electrocatalyst particles including alloys or mixed metal/metal oxides as the active species. Traditionally, platinum is alloyed with various elements such as ruthenium, nickel, cobalt or chromium.

Typically, alloys are produced by the deposition of two or more metals or metal oxides on the surface of the carbon. Subsequently, the metals/metal oxides are subjected to a high temperature post-processing step in a reducing atmosphere to alloy the active species. This post-processing step reduces any metal oxides and allows the different species to migrate over the surface and coalesce to form an alloy.

According to one embodiment of the present invention, spray processing techniques are used to produce modified electrocatalyst products having a platinum alloy having a small metal and/or metal oxide crystallite size. Small crystallite sizes are possible because the metal can be bound to a surface group (e.g., such as an electron donating carboxylic and/or amine functional group) and steric hindrance of the surface group prevents large crystallite growth during consecutive steps of metal deposition and/or post-processing or reduction steps. Other electron donating surface groups useful in accordance with the present embodiment include alcohols, ethers, polyalcohols, unsaturated alkyls or aryls, thiols and amines.

By way of illustration, a carbon material, such as carbon black, can be co-modified with carboxylic and amine groups (e.g., $(C_6H_4)CO_2H$ and $(C_6H_4)CH_2NH_2$). When this carbon material is treated with a metal salt (e.g., $RuCl_3$), the metal center will bind to the amine functionality on the carbon surface. When this material is subsequently exposed to a second metal salt (e.g. $Pt(NH_3)_4(OH)_2$ or $Pt(NH_3)_4(NO_3)_2$), it will weakly bind to the carboxylic group of the carbon surface. When this resulting multiply-modified carbon product is heated under mild reducing conditions, a finely dispersed alloy (e.g., a platinum plus ruthenium) electrocatalyst is produced.

Mixing of the alloy constituents (e.g., Pt and Ru) at the atomic level reduces the severity of, or eliminates, the post-processing conditions that are required for alloy formation, which in turn reduces crystallite sintering and improves alloy crystallite homogeneity. In one embodiment, the modified electrocatalyst products including a metal alloy are produced at temperatures not greater than 400° C. During processing, it is preferable to have chemically inert surface groups, such as $C_5H_4N$, $(C_6H_4)NH_2$, C6H5, $C_{10}H_7$ or $(C_6H_4)CF_3$, due to pH effects with the precursor salts. Additionally, if both metals have the same affinity for the attached surface group(s), the addition of a homogeneous distribution of a different metal species leads to an even distribution over the carbon surface. Again, such an approach will result in an atomic distribution of the metal species, for example, Pt and Ru, anchored and distributed evenly over the carbon surface. This even distribution enables alloy formation at lower processing temperatures, and, hence, smaller alloy crystallite sizes and better catalytic performance.

According to another embodiment of the present invention, one or more metal or metal oxide precursors can be deposited on the modified carbon product where a post-processing step occurs between the two deposition steps. For example, a metal or metal oxide precursor can be added to a modified carbon support where a surface of the carbon that is not modified preferentially adsorbs the precursor, and after a post-processing decomposition step, first metal or metal oxide clusters are formed. This is followed by deposition of a second precursor, which preferentially adsorbs on the surface of previously formed first metal or metal oxide clusters. After the second decomposition step, a fine composite cluster is formed (e.g., where the second element deposits either as a monolayer or as clusters onto the surface of the first metal clusters).

By way of example, and as depicted in FIG. 7, a modified carbon product having surface groups relatively inert to an active species phase (e.g., $SiMe_3$) can be utilized to selectively produce an alloyed modified electrocatalyst product. A first metal/metal oxide (e.g., $RuO_2$) can be deposited on the carbon material surface in locations where the surface groups are not located. After a post-processing step, a second metal/metal oxide (e.g., Pt) can then be selectively deposited, where the second metal/metal oxide preferentially is adsorbed onto the surface of the first metal/metal oxide clusters to form a composite active species phase cluster and/or a thin surface active layer, which may be used as a support for other deposited materials.

It will be appreciated that one or more of the metal or metal oxide species described above can be deposited by any known method, including liquid phase adsorption (as discussed above), spray-based processing, chemical vapor deposition, under potential deposition, electroless deposition or liquid-phase precipitation. In such cases, the carbon can be modified such that the metal/metal oxide precursors in the second deposition process cannot absorb onto anything other than the first metal/metal oxide initially deposited, resulting in improved crystallite dispersion, uniformity of alloy formation and elimination of segregation phenomena.

As described above, alloy electrocatalysts typically require post-processing to ensure a proper degree of alloying to provide long-term stability of the active sites. During this post-processing step, the alloy crystallites have a tendency to sinter, resulting in crystallite growth. Modified carbon products can be used to minimize this effect. With the integration of modified carbons as the support structure, the metal/metal oxide dispersion is significantly increased since the surface modification blocks part of the surface and inhibits migration. This prevents surface diffusion and agglomeration of the alloy clusters during the reduction/alloying step.

For example, modifying the surface of the carbon material with thermally stable steric groups, such as phenyl ($C_6H_5$) or napthyl ($C_{10}H_7$) groups acts to physically block migration of metal and metal oxide species across the surface of the carbon. When an electrocatalyst is produced with a greater metal/metal oxide dispersion (i.e., smaller crystallite size), and the species to be alloyed (e.g. mixed metal/metal oxides) requires a lower temperature for alloy formation, a reduced grain growth and better dispersion of the alloy clusters results. Reduced grain growth leads to smaller alloy crystallite size, increased catalytic activity and increased precious metal utilization. Additionally, as described previously, where surface modification groups are intact after the post-processing procedure, they can sterically prevent the metal crystallites from growing by blocking diffusion paths.

Modified Carbon Products and Electrode Layers

Various aspects, approaches, and/or embodiments of the present invention are described below, primarily in reference to modified carbon products in electrodes and with electrocatalysts. However, it will be appreciated that non-modified electrocatalyst materials can be utilized in conjunction with modified carbon products in many of such aspects, approaches and/or embodiments, where appropriate, although not specifically mentioned, and the use of such electrocatalyst materials in such aspects, approaches and/or embodiments is expressly within the scope and spirit of the present invention.

As discussed previously, the performance of the electrode layers within a fuel cell MEA is a function of many variables, including catalytic activity, electrical conductivity, proton conductivity and porosity. Typically, the electrode layers in a PEMFC include a catalytic material, such as platinum, platinum alloy or mixed metal/metal-oxide clusters, dispersed on a carbon support, a binder and a proton conductive additive. A typical proton conductive additive is a sulfonated polymer, such as PFSA (perfluorintated sulfonic acid), which can act both as a binder and a proton conductor. As described above, the dispersed metal or metal oxide clusters on the support serve the main function of catalysis, aiding the oxidation reaction of the fuel and the reduction reaction of the oxygen on the anode and cathode side of the MEA, respectively. The polymer additive is typically utilized to aid in binding the fabricated electrode together, aid in proton conductivity, and to aid in the reaction of protons and oxygen ions to form water. Some electrodes, such as those used in alkaline, phosphoric or high temperature acid fuel cells, contain a perfluorosulfonated PTFE type of polymer as a binder and a hydrophobicity modifier.

One embodiment of the present invention is directed to the use of modified carbon products in the electrode layer. Modified carbon products can be utilized to enhance the catalytic activity, proton conductivity, electron conductivity, mass transport, porosity, humidification requirements, adhesion to adjacent layers and reliability of the electrodes.

Catalytic Activity

According to one embodiment of the present invention, a modified carbon product having appropriate functional groups can be used to tailor the location of active sites within the electrode by tailoring the microporosity and mesoporosity of the carbon support material. Carbon support materials for electrocatalysts generally include microporous regions and mesoporous regions. It is generally preferred to disperse the active species phase on the carbon support and within the mesoporous regions, where reactants may more easily access the active species phase. The functional groups can advantageously be selected to block the ability of the active species phase to reach the microporous regions of the carbon support, such as by decreasing the amount of available paths to the microporous regions and/or by attaching to the microporous regions. Subsequently, the active species phase can be dispersed on the modified carbon product, and will predominantly be located in the mesoporous regions due to the decreased availability of the microporous regions, thereby resulting in a modified electrocatalyst product having increased catalytic activity.

For example, a carbon material (e.g., carbon) black can be modified with a proton conducting functional group (e.g., a carboxylic or sulfonate group) to block the microporosity existing in the carbon black powder, which reduces the surface area of the powder. Preferably, the remaining surface area available to the active sites include pores having a size of at least about 1 nm. When this modified carbon product is used for the deposition of active sites, such as Pt clusters, the deposition of the sites will be reduced in microporous regions and will occur preferentially in mesoporous regions of the carbon support, thereby increasing accessibility of reactants to the active sites. In addition, the presence of hydrophilic functional groups, such as carboxylic and/or sulfonate groups, provide for better dispersability of the modified electrocatalyst product in liquids.

Figure 8:
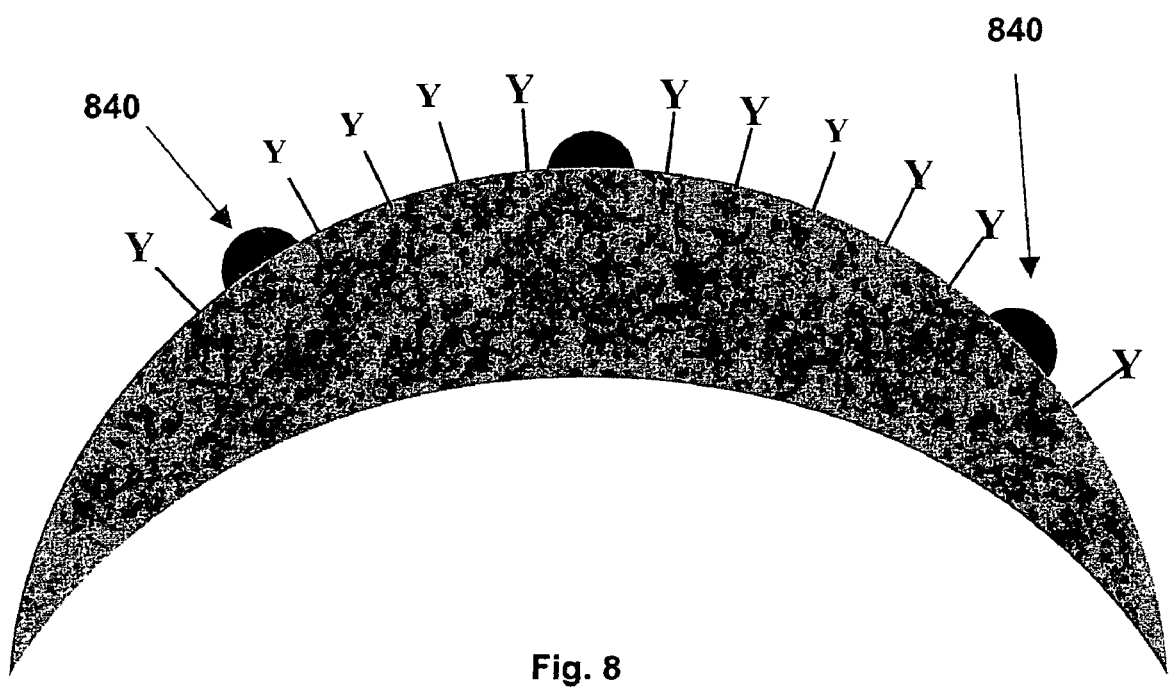
FIG. 8 illustrates the use of surface functional groups to decrease the agglomeration of active species on a carbon support according to an embodiment of the present invention.

A major cause of supported catalyst deactivation is the agglomeration of the active sites, since the dispersion of the active species is directly related to catalyst performance. According to one embodiment of the present invention, modified carbon products are utilized for Me/carbon or MeOx/carbon electrocatalysts (e.g., where Me is the active species phase such as Pt or PtRu, Mn, PtNiCo, etc.), where the modification group improves the dispersion of the active species clusters and limits surface migration of the clusters, thus decreasing agglomeration of the active species, as depicted in FIG. 8. As depicted in FIG. 8, surface functional groups (Y) block migration/agglomeration of Pt crystallites 840. The ability to retain the surface modification during catalyst processing and the ability to add a surface modification to a Pt/C or other Me/C catalyst provides multiple routes to introduce groups that will sterically inhibit migration, and thus agglomeration, of the active species phase during processing and formation of the active sties.

Furthermore, similar modifications as described above can reduce active species agglomeration by limiting the extent of carbon oxidation. Carbon oxidation is a process that occurs on the surface of the carbon under typical fuel cell operating conditions, and leads to changes in the surface properties and morphology of the carbon. For example, carbon oxidation can lead to the formation of more hydrophilic groups at the active species surface and/or to an erosion of the carbon surface, which may result in changes in the carbon surface area and/or agglomeration of the active species phase clusters. The presence of surface functional groups can inhibit the carbon oxidation process and therefore limit, and in some cases even prevent, changes in the carbon surface properties and morphology. Such functional groups also prevent changes in the hydrophilic properties of the carbon surface and active phase dispersion, and, thus, increase the long term stability of electrocatalysts made or post-treated with a surface functional group.

Another method for improving active species dispersion and limiting active species agglomeration is by using functional groups to direct the deposition of platinum on the carbon. By varying the type of surface group, the surface concentration of the functional groups and/or the chain lengths of the linking groups, the surface properties such as adsorption characteristics, hydrophobic/hydrophilic characteristics and the surface modification adsorption mechanism for the active species phase or other precursor adsorption can be influenced to achieve better dispersion of active sites on the surface of the carbon support, as described above.

According to another embodiment of the present invention, the catalytic activity is increased by using surface groups to anchor the catalyst precursor to the carbon support. According to another embodiment of the present invention, a modified carbon product is used to increase dispersion of the active species phase (e.g., platinum) through the use of binding surface functional groups. Here, functional groups are used that can selectively bind to the active species phase, as described above.

For example, in the case of platinum, one metal atom will bind to one functional group, which leads to increased platinum dispersion and a smaller platinum particle size. As the electrocatalyst is processed, the functional group decomposes leaving small platinum nanocrystallites.

Active species phase coverage can also be improved by blocking portions of the carbon surface, resulting in directed deposition with controlled platinum distribution and particle size. Functional groups, such as sulfonate groups, attached to the modified carbon product can be reduced utilizing a basic active species phase precursor solution, such as platinum nitrate. Reduction of the dried product will yield the catalyst. After reduction, the functional groups can be regenerated and the neutralization procedure can be repeated to form modified electrocatalyst products having higher dispersion of active species phase on the carbon support. In this regard, platinum loading can be from 0.5 wt % to about 60 wt % platinum supported on carbon.

Figure 9:
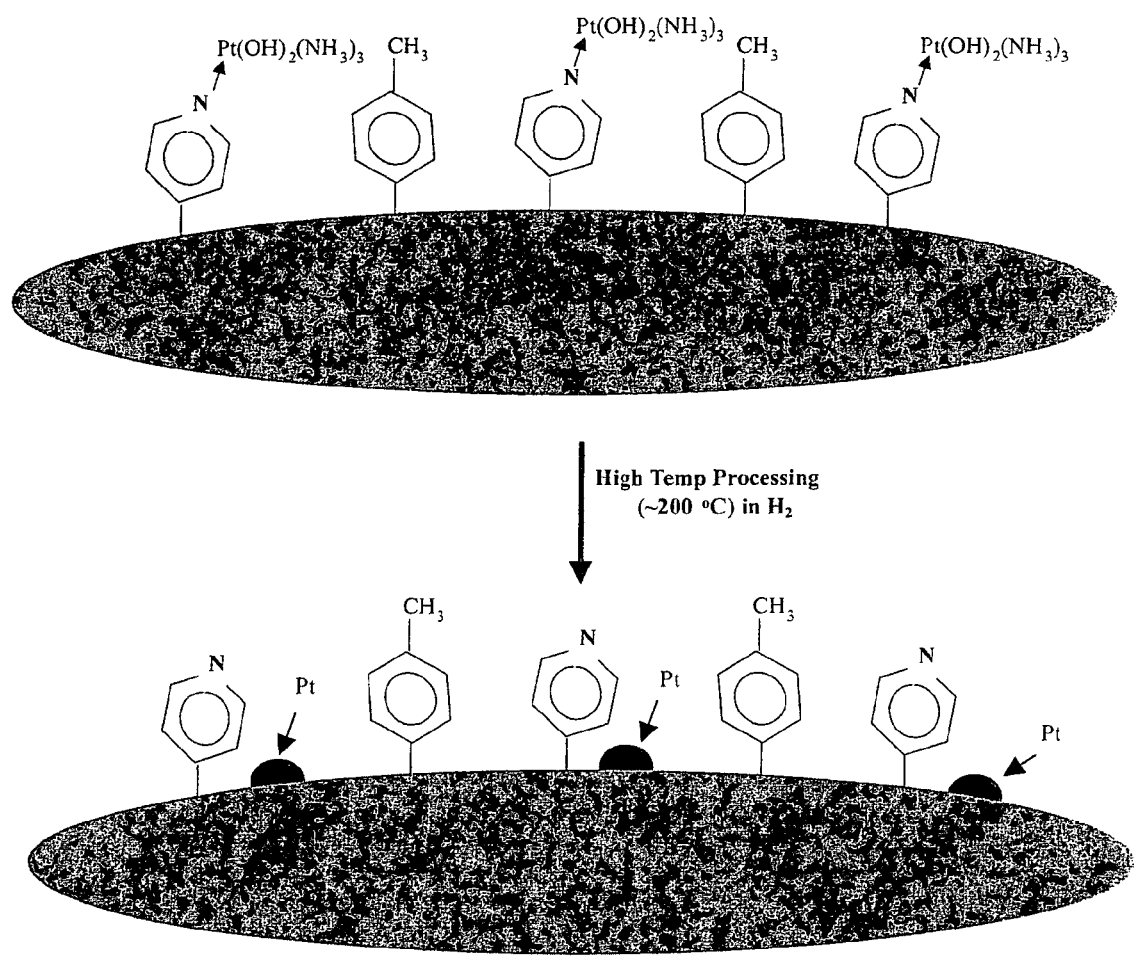
FIG. 9 illustrates the decomposition of an active species precursor grouped to a linking group in accordance with an embodiment of the present invention.

In another embodiment of the present invention, the linking group (R) may be utilized to reduce or prevent migration and agglomeration of the active species phase. Generally, the linking group stays substantially intact (e.g., is substantially inert) during production of modified carbon products. For example, a modified carbon product may be dispersed in a solution comprising an active species phase precursor, such as a solution comprising a molecular metal precursor in water. The resulting solution including the modified carbon product and the active species phase may be processed, such as illustrated in FIG. 9, to decompose the active species precursor anchored to the linking group, (e.g., a pyridine group) thereby providing small active species clusters (e.g., crystallites) on the carbon surface that are protected from oxidation, poisoning and agglomeration by the remaining functional and/or linking groups (e.g., pyridine and toluene groups).

Figure 10:
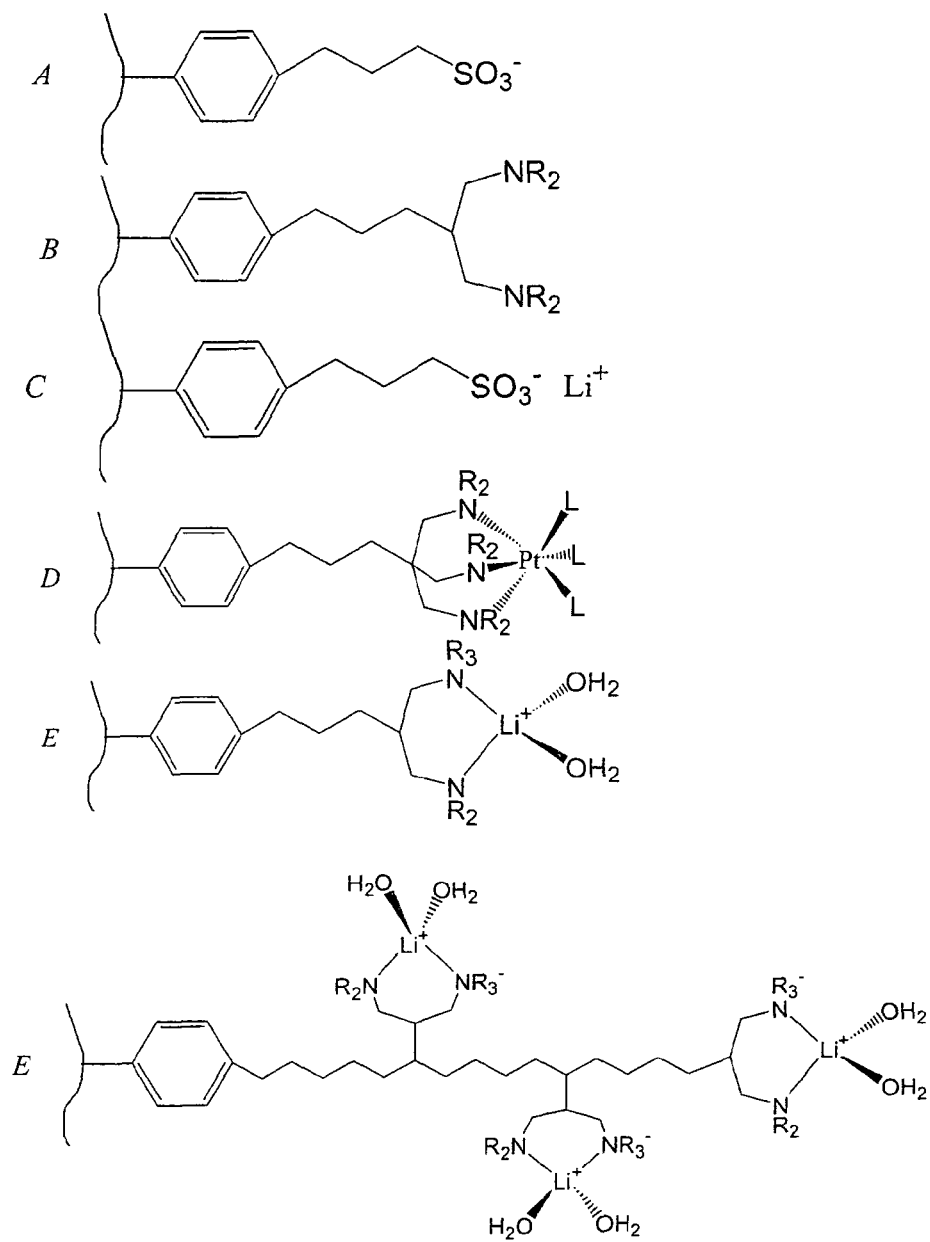
FIG. 10 illustrates chelating or metal binding functional groups that are useful according to an embodiment of the present invention.

Another embodiment of the present invention is directed to the use of surface functional groups to act as a nucleation site for the active species phase. Here, a chelating surface functional group, such as $RCO_2H$, can chelate a metal, such as a Ru or Pt, which aids in the formation of small, well-dispersed active species crystallites. There are a variety of chelating or metal binding functional groups that can be used, some of which are depicted in FIG. 10. Examples of preferred chelating ligands according to the present invention include polyamines, polyphosphines, polycarboxylates, ligands with mixed functionality such as amino acids, ethylenediaminetetraacetic acid (EDTA) and prochiral ligands.

The organic groups of the modified carbon products can also be used to interact with a metal active species to form what is referred to herein as metal-functionalized carbon products. There are two general classes of metal-functionalized carbon products. The first class is a carbon product that is functionalized with metal ions that are relatively weakly coordinated to the surface functional group. These metal ions are relatively easily exchanged and impart ion-exchange functionality to the material. The second class of metal-functionalized carbon products includes a metal species that is coordinated in a more covalent fashion to form a surface bound coordination complex. These metals are typically less easily exchangeable, are coordinated in a more rigid ligand environment, and impart a functionality that is based on having a metal species coordinated in a particular environment on the surface. In one embodiment, the coordinated metal complex acts as a precursor to a reduced metal species, typically metal nanoparticles that are subsequently dispersed over the surface of the support phase, leading to, in the case of Pt, finely dispersed Pt/C electrocatalysts.

In one embodiment of the present invention, where the metal species to be bound is required to exist in an ionic form, the surface functional group is typically easily ionizable. Examples of these terminating groups include sulfonic acids, e.g. $-SO^{3-}$ and $NH^{3+}$. The metal species can be in the form of a discrete or hydrated metal ion, such as $Li^+$, $K^+$, $Na^+$, $Ca_2^+$ or $Mg_2^+$. In the case where the metal is bound in a covalent state to form a coordination compound, the surface functional terminating group is preferably an electron pair donor. In this case, the formed metal species is a coordination complex, where the surface function group can be neutral (e.g., $NR_2$, SR) or can be charged, such as $CO^{2-}$. Other ligands may also be present in the coordination sphere of the metal ion to satisfy the coordination number of the species such as nitrogen donors (e.g., amines), phosphorus donors (e.g., phosphines), sulfur donors (e.g., thiols), oxygen donors such as alcohols, ketones aldehydes and carboxylic acids. Such approaches allow for the binding of Pt species like, for example, $Pt(OH)_2(NR_3)_4$, where the surface functional groups can displace donor groups such as $NR_3$ anchoring the molecular Pt species to the individual surface sites on the carbon materials.

One embodiment of the present invention is directed to the use in spray-based processing to form modified carbon products to act as a nucleation site for metals like Pt and Ru. Another embodiment is the use of this process in solution-based precipitation processing, and yet another is the use of this approach is in chemical vapor deposition (CVD), aerosol-assisted CVD (AACVD) or gas to particle conversion (GPC) processing.

Examples of these methods are disclosed in U.S. Pat. No. 5,155,081, U.S. Pat. No. 5,569,635, U.S. Pat. No. 6,492,295, U.S. Pat. No. 6,066,410, U.S. Pat. No. 6,417,133, U.S. Pat. No. 6,194,338, U.S. Pat. No. 6,339,038, U.S. Pat. No. 5,110,779 and U.S. Pat. No. 6,284,213, each of which is incorporated herein by reference in its entirety.

Proton Conductivity

As described above, the electrode can be formed by deposition of the modified carbon product and/or modified electrocatalyst product on a PEM or a gas/fluid diffusion layer. In this regard, the electrode layers generally include proton conducting material to provide a proton conductive pathway from the active species phase site (e.g., location of the Pt clusters) to the proton conducting membrane, and vice versa.

Traditionally, proton conducting paths have been formed by mixing a conventional proton conducting material with an electrocatalyst material. Such proton conducting materials are generally only a few nanometers in size, and processing is difficult in a variety of respects, including non-uniform deposition within the electrode layer, covering and deactivation of some of the active sites (e.g., Pt clusters), deposition of larger clusters within the layer pores, and segregation of the proton conducting material within the electrode leading to insufficient material in other areas. As a result, active species utilization in the electrodes is typically decreased since protons generated at the catalytic sites are not effectively transported from or to the proton exchange membrane. Another disadvantage is that higher quantities of polymer are typically needed to increase catalyst utilization. However, this generally results in a decrease in the electrode porosity, which negatively affects the mass transport of gas and liquid reactants and products. An increased amount of active species is also often incorporated in the electrode to compensate for catalyst materials that go unutilized or are underutilized due to their remote location from the proton conducting sites.

One embodiment of the present invention is directed to the use of a modified carbon product and/or modified electrocatalyst product having a proton conducting functional group attached thereto, such as a sulfonate and/or phosphonic group. In a particular embodiment, the proton conducting functional group is attached to the carbon material and/or electrocatalyst material prior to deposition and/or use. In another embodiment, the proton conducting functional group is attached after the carbon material and/or electrocatalyst material has been incorporated in the fuel cell component. Preferred proton conducting functional groups according to the present invention are listed in Table III, above.

Figure 11:
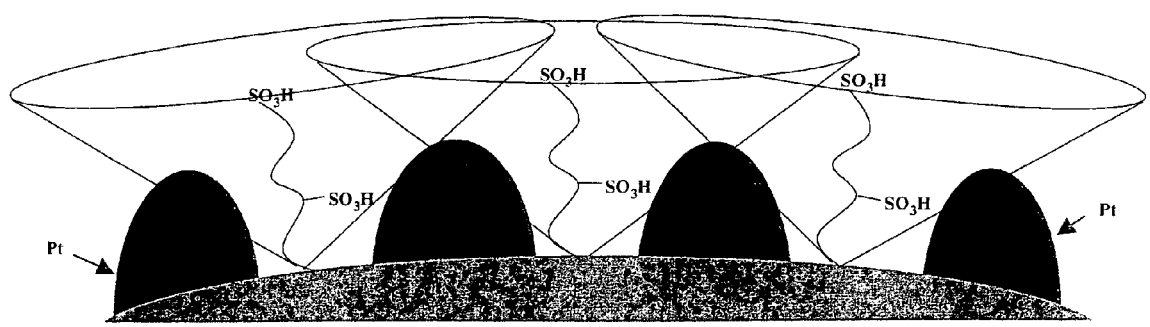
FIG. 11 illustrates a proton conducting functional group attached to a carbon surface where the functional group includes a large cone angled to permit rapid proton conduction according to an embodiment of the present invention.

Active species phase utilization is significantly increased by creating an efficient proton conducting pathway within the electrodes. Since the proton conductive functional groups are covalently attached to the carbon surface, the uniformity of the proton conductive pathways is significantly improved. As a result of the dimensions and proton conductive properties of the functional groups, an increase of from 40% up to 100% of the active species utilization in the electrode layers can be achieved. Utilization percent is defined as the percent of active species surface area (as measured in-situ in a singe MEA) normalized by the total active species surface area (as measured ex-situ by gas absorption methods). By way of example, and as illustrated in FIG. 11, a proton conducting functional group, such as a sulfonate group, having a large cone angle can sweep over a wide area to ensure it is proximal to at least one active site, which increases the efficiency of proton transport to active sties, and therefore increase reaction activity.

Mixtures of conventional proton conducting materials and modified electrocatalyst products can also be employed to provide a proton conductive pathway. In one particular embodiment, a conventional proton conducting material (e.g. NAFION) is mixed with a modified electrocatalyst product having a proton conducting functional group (e.g., modified carbon black particles having a sulfuric functional group), and this mixture is utilized (e.g., in an ink) to produce a proton conducting pathway within the electrode. In this regard, the mass ratio of convention proton conducting materials to modified electrocatalyst product is preferably at least 1:1, but no more than 5:1, and preferably in the range of 1.5:1 to about 3.5:1.

The sub-nanometer dimensions of the functional groups also enables the creation of proton conductive pathways that are proximal to the active species phase sites, which further ensures effective transport of protons without blocking the active sites and without decreasing the porosity of the electrodes. A further benefit of maintaining porosity is that fluids, such as hydrogen gas, water, methanol and carbon dioxide gas can be efficiently transported in and out of the fuel cell.

Electron Conductivity

Another embodiment of the present invention is directed to the use of modified carbon products to increase the electrical conductivity of the electrode layer. This can be achieved by: (1) minimizing the oxidation of the carbon surface during fuel cell operation; (2) using a higher conductivity carbon; (3) reducing the amount of proton conducting polymer in the electrode layer; (4) increasing the solids loading of carbon; and (5) using carbon with a higher structure (e.g., primary carbon particles are interconnected in aggregates).

A decrease in carbon oxidation during fuel cell operation will reduce the loss of conductivity, which is usually related to oxidation of the carbon surface. This is accomplished by the addition of non-hydrophilic/polar groups such as halogenated alkyls and aryls.

The ability to modify the surface of different carbons with, for example, hydrophilic functionality, allows the use of high conductivity carbons, such as graphitic carbon, in the electrodes, either as catalyst supports or as a conductivity enhancing additives. Since graphitic carbons are more conductive and more chemically inert, they are desirable for use in electrodes, but typically have a large particles size and are difficult to disperse for ink preparation. Therefore, the modification of the surface of graphitic carbons with hydrophilic functional groups (for aqueous-based inks) or hydrophobic functional groups (for organic-based inks) enable the use of graphitic carbons, and a corresponding increase in the electrical conductivity. In addition, graphitic carbons are less susceptible to oxidation than other carbon materials, such as carbons blacks, and, therefore, have long-term stability in the MEA.

One method for increasing the electrical conductivity of the electrode is by reducing the amount of conventional proton conducting polymer utilized in the electrode. Since proton conducting polymers are generally not electrically conductive, it is advantageous to replace all or a portion of conventionally utilized proton conducting polymer materials with a proton conducting modified carbon product, as described above.

By way of illustration, a modified carbon product having a proton conducting functional group attached thereto, such as a sulfonate group, can be utilized in an electrode to increase the density of proton conducting groups. Therefore, the amount of conventional proton conducting materials can be reduced and/or eliminated, resulting in an electrode having an increased electrical conductivity without affecting the proton conductivity of the layer.

Another method for increasing the electrical conductivity of the electrode is to increase the amount of carbon material utilized in the electrode. For example, modified carbon products having a hydrophilic functional group can be utilized in conjunction with a polar solvent, such as water, to create a modified carbon ink, as discussed in further detail below. The modified carbon ink can be subsequently deposited to create an electrode layer. In contrast to traditional solutions including such carbon products, the hydrophilic nature of the modified carbon product increases the amount of carbon that can be utilized in the solution, and correspondingly increases the amount of carbon in the electrode layer.

Carbons with a higher structure can form inter-penetrating/interconnected electrode structures. These higher structures, due to the increased carbon/carbon overlap, can increase electrical conductivity, which is even more pronounced at higher solids loadings. In addition, at the interface of the electrode at the gas/fluid diffusion layer, interconnected carbon supports (e.g., the carbon materials of the modified electrocatalyst products) ensure better contact with the conductive fibers of the gas/fluid diffusion layer, and, therefore, lower contact resistance can be achieved. Particularly, carbons with a higher structure, such as carbon black, can be formed into modified carbon products that can be added to the electrode (both as a catalyst support and/or conductivity enhancement additive) at low or high solids loadings. In one embodiment, the electrode contains not more than about 70 wt. % carbon, inclusive of modified and non-modified carbon products.

Mass Transport, Porosity and Humidification

In another approach, modified carbon products having hydrophilic functional groups can be used in the anode of a PEMFC or a DMFC to improve the performance of the anode. The hydrophilic character of the modified carbon products enables water retention at the anode side, which translates into better water management and/or the ability to operate at reduced humidification levels.

In another example, the introduction of hydrophobic functional groups (e.g., fluorinated groups) can prevent water flooding at high currents, creating hydrophobic pores for the oxygen reduction reaction (ORR) and create paths for water to escape from the cathode. Hydrophobic treatment of the electrode is often necessary because, proton conducting polymers are hydrophilic, and their use alone gives the electrode a hydrophilic character, which enables water retention and exacerbates flooding. Traditionally, a hydrophobic raw material is utilized with an electrocatalyst material as the electrode is created. The electrode is then heated at a relatively high temperature to flow the hydrophobic material and disperse it within the electrode. Proton conducting materials are subsequently added to the electrode, instead of during manufacture due to the processing temperature. This results in uneven dispersement within the electrode. Moreover, flowing of the hydrophobic material often results in the hydrophobic material covering a portion of the active sites, which reduces active site utilization within the electrode.

Conversely, controlling distribution of the hydrophobic groups within the electrode, such as by utilizing modified carbon products and/or modified electrocatalyst products having a hydrophobic functional group, produces hydrophobic pores selectively proximal to active sites. These hydrophobic pores, in addition to their water rejection capability, facilitate the diffusion of gaseous reactants to the catalytic sites by preventing water blockage of the active sites. As a result, active site utilization is increased. Moreover, in combination with selective placement of proton conducting functional groups, an organized three-phase interface (e.g., the interface of active species phase, the proton conducting phase and the hydrophobic phase) can be created, where reactants are efficiently distributed to the active sites, and where products, such as protons and/or water, are efficiently transported away from the active sites.

According to another embodiment of the present invention, by using modified carbon products and/or modified electrocatalyst products, an electrode layer with increased porosity and increased proton conductivity can be formed. As is discussed above, the presence of the proper degree of porosity is important for the performance of the electrode layers and/or the electrocatalysts. Electrodes having appropriate pore types, pore sizes and pore size distributions will ensure good gas permeability and adequate water ejection. According to the present invention, utilizing modified carbon products and/or modified electrocatalyst products having hydrophilic and/or hydrophobic groups significantly affects the type, size and size distribution of the pores within the electrode.

According to one embodiment of the present invention, modified carbon products, and/or modified electrocatalyst products, are utilized to achieve the desired electron and proton conductivity with increased porosity. The reduction in the amount of polymer additives by utilizing modified carbon products and/or modified electrocatalyst products to form the electrode results in electrodes with higher porosity, which is beneficial for electrode transport properties. The addition of conventional polymer materials to the electrode layer lowers the porosity of the electrode layer, inhibiting the mass transport of reactants and products. The inclusion of appropriate modified carbon products, as described above, decreases the amount of conventional polymer additives that must be utilized, and correspondingly increases the porosity within the electrode layer. Moreover, swelling, which is normally associated with conventional proton conducting material, will not be observed, which also contributes to an increased processed within electrode.

The use of modified carbon products and/or modified electrocatalysts products can also ensure better pore size distribution within the electrode. By way of illustration, a high surface area carbon maybe modified with a proton conducting functional group. Since the carbon surface is occupied, the BET surface area of the carbon, which relates to microporosity, will significantly decrease. However, the T-area, which relates to mesoporosity, will only slightly decrease. Producing an electrode utilizing such modified carbon products will result in an electrode having an increased proton conductivity and electrical conductivity as compared to an electrode formulated with polymeric materials. Thus, the use of modified carbon products can reduce the BET surface area of the electrode, preferably by about 10% to about 70%, but may not significantly decrease the T-Area of the electrode as measured by DBP (Dibutyl-phthalate) oil adsorption (ASTM D-2414).

Water management within the fuel cell, especially the cathode, is an issue that can lead to significant transport and ohmic losses during operation. While operating at high current densities, cathodes can become flooded by water generated at the catalytically active sites due to the hydrophilic nature of nearby carbon and proton conducting materials. Even in fuel cells operating at high pressure conditions, flooding is an issue, especially when the electrode comprises pores smaller than a few nanometers in size.

According to one embodiment the present invention, water management within the electrodes can be significantly improved by incorporation of mixed hydrophilic/hydrophobic functionality in the electrodes by utilizing one or more modified carbon products, and/or modified carbon products that have different ratios of hydrophilic vs. hydrophobic functional groups. For example, a balance between hydrophilic and hydrophobic porosity can be achieved by using a modified carbon product having a mixture of hydrophilic and hydrophobic functional groups, such as by using both a sulfonated group and a fluorinated group on the same carbon support material. In another embodiment, modified carbon products and/or modified electrocatalyst products having different functional groups can be mixed in pre-selected ratios. In a particular embodiment, modified electrocatalyst products having both hydrophilic and hydrophobic functional groups attached thereto can be mixed with a modified carbon product having only hydrophobic functional groups attached thereto. These mixtures can be used to form electrodes, such as by deposition utilizing an ink. The electrode can also include consecutive layers, where the layer closest to the gas/fluid diffusion layer includes only modified carbon products modified with a hydrophobic group, followed by layers including both modified carbon products and modified electrocatalyst products, where the ratio of the proton conducting groups and hydrophobic groups is varied to achieve differing degrees of hydrophobicity/hydrophilicity within the electrode.

One embodiment of the present invention is directed to the use of modified carbon products to form relatively thin electrodes. A thin electrode enables greater catalyst utilization by minimizing ohmic and transport losses, which result in lower costs and higher mass transport.

Traditionally, electrocatalyst products are not well dispersed, either in an ink incorporating such materials or the electrode itself, which results in gas cross-over and pinholes in the electrode layer. Moreover, the materials are often poorly interconnected and have a high degree of surface roughness, which makes the electrode layer more susceptible to degradation.

Modified carbon products and modified electrocatalyst products are advantageous in thin electrodes because they are able to enhance catalyst loading and interconnectivity. Moreover, modified carbon products and or modified electrode products can also be formed as small, spherical, unagglomerated particles, which are highly desirable properties for dispersing in an ink. Moreover, dispersion within the ink can be increased when solvent matching functional groups are utilized (e.g., hydrophilic functional groups for polar aqueous-based inks and hydrophobic functional groups for organic based inks). Such inks can be utilized to create very thin electrode layers. Moreover, the small, spherical and unagglomerated particles produce a high packing density in the electrodes, which aid in minimizing thickness of the electrode.

Interface with Adjacent Components/Adhesion

Another embodiment of the present invention is directed to the incorporation of modified carbon products and/or modified electrocatalysts products to improve the interface contact between: a) electrode layers and the PEM; and b) electrode layers and the gas/fluid diffusion layers. In this regard, the modifying group can form a physical or chemical bond to the PEM or the gas/fluid diffusion layer, due to improved dispersability of the modified electrocatalyst product, forming a smoother surface and increasing contact area with the PEM or gas/fluid diffusion layer.

By way of illustration, modification of an electrocatalyst material with a hydrophilic functional group enables preparation of a uniform, low viscosity aqueous ink, which can be formed into a smooth, crack-free electrode layer. Such a layer increases contact with the PEM because the hydrophilic functional groups of the modified electrocatalyst product hydrogen bond to the adjacent proton conducting polymer groups covalently bonded to the PEM polymer backbone. This improves bonding between the electrode and the proton exchange membrane, decreases contact resistance, and therefore, minimizes ohmic losses and enhances proton transport. Another benefit is reduced delamination and structural deterioration during long term operation of the fuel cell.

Another embodiment of the present invention is directed to the use of modified carbon products to increase the adhesion of the electrode layer to the gas/fluid diffusion layer and/or to the proton exchange membrane. An electrode made from modified carbon products and/or modified electrocatalyst products may form a physical interlocking bond or a chemical bond to the gas/fluid diffusion layer or the proton exchange membrane. In this regard, polymeric functional groups and/or linking groups can be utilized to increase adhesion of the electrode layer to the gas/fluid diffusion layer and/or the proton exchange membrane. Such polymeric functional groups can be physically intertwined with the surface of the gas/fluid diffusion layer and/or the proton exchange membrane, which increases adhesion. In another embodiment, hydrophilic functional groups can be utilized to increase hydrogen bonding between the electrode layer and the other surface. It will be appreciated that both hydrophilic functional groups and/or polymeric functional and/or linking groups can be utilized on a modified carbon product(s) to achieve such properties.

Long Term Reliability

Another embodiment of the present invention is directed to the use of modified carbon products to increase the long-term reliability of the fuel cell. Typically, performance of the electrode decreases over time due to several reasons, including carbon oxidation and active species agglomeration.

One object to of the present invention is to increase the long-term stability of the electrode by using modified carbon products to reduce carbon oxidation. In one approach, hydrophobic and/or oxygen repellent functional groups such as fluorinated groups are utilized to reduce carbon oxidation. Groups that can be used are hydrophobic surface functional groups, or a mixture of hydrophobic and proton conducting hydrophilic surface functional groups that include saturated and unsaturated alkyls, aryls, and halogenated species. In another approach, a mixture of carbons that have either hydrophobic surface groups or hydrophilic terminating groups or carbon materials that are co-modified with hydrophobic and hydrophilic groups can be used. Carbon oxidation can also be reduced by utilizing carbon materials that are resistant to oxidation, such as graphite.

Another embodiment of the present invention is directed to an increase in long-term reliability of an electrode by using modified carbon products to reduce active species agglomeration. Traditionally, as a fuel cell operates, the active species phase can migrate and agglomerate into large particles, thereby resulting in a drop in electrode performance (current density versus voltage). Utilizing large steric groups, such as polymeric functional groups, to modify the surface of the carbon materials blocks for migration and hence agglomeration of the active species phase.

Formation of Electrode and Electrocatalyst Layer

Figure 12A:
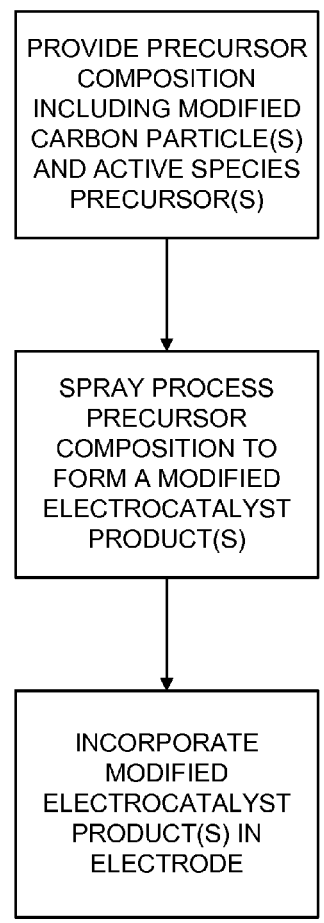
FIGS. 12(a) to 12(e) illustrate different methods for incorporating a modified carbon product in an electrode according to an embodiment of the present invention.

Various methodologies may be utilized to incorporate a modified electrocatalyst product in an electrode, as described above. One approach, as depicted in FIG. 12(a), includes the steps of providing a precursor composition including a modified carbon product and active species precursor, spray processing the precursor composition to form a modified electrocatalyst product, and incorporating the modified electrocatalyst product into an electrode. It will be appreciated that more than one type of modified carbon product and/or active species precursor may be utilized in this approach to form a plurality of modified electrocatalyst products and/or multiply-modified electrocatalyst products.

Figure 12B:
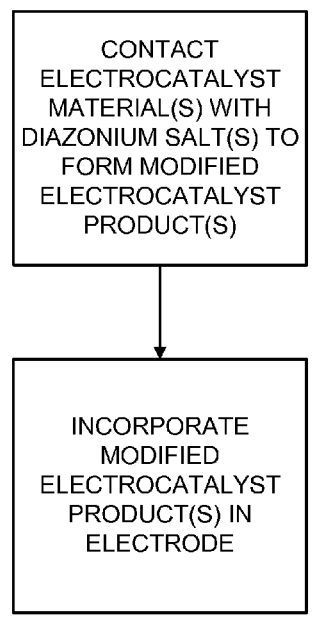

Another approach, as depicted in FIG. 12(b), includes the steps of contacting the electrocatalyst material with a diazonium salt to form a modified electrocatalyst product and incorporating the modified electrocatalyst product into an electrode. It will be appreciated that more than one type of electrocatalyst material and/or diazonium salt may be utilized in this approach to form a plurality of modified electrocatalyst products and/or multiply-modified electrocatalyst products.

Figure 12C:
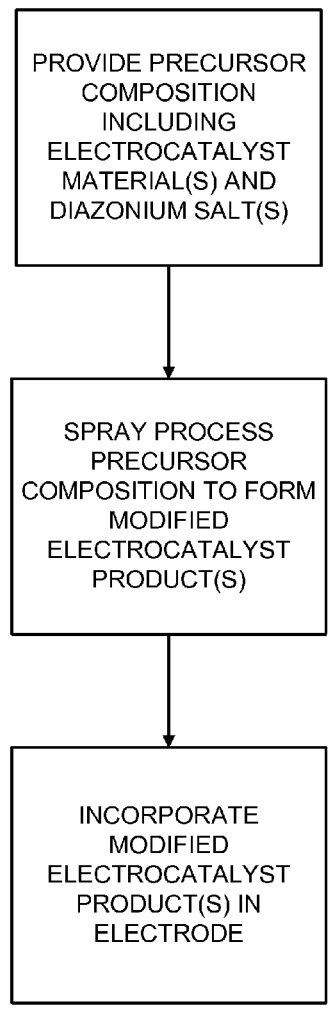

A specific approach in this regard, as depicted in to FIG. 12(c), utilizes spray processing techniques, and includes the steps of providing a precursor composition including an electrocatalyst material and a diazonium salt, spray processing the precursor composition to form a modified electrocatalyst product, and incorporating the modified electrocatalyst product into an electrode. It will be appreciated that more than one type of electrocatalyst material and/or diazonium salt may be utilized in this approach to form a plurality of modified electrocatalyst products and/or multiply-modified electrocatalyst products.

Figure 12D:
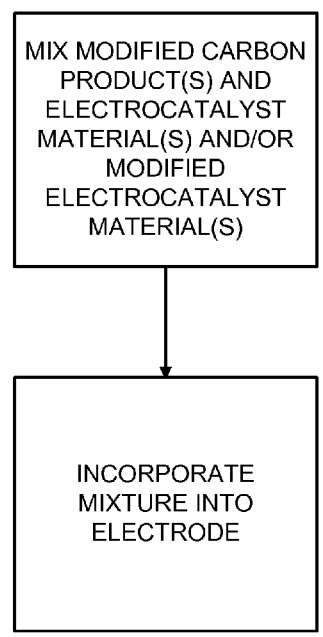

Yet another approach, as depicted in FIG. 12(d), includes the steps of mixing a modified carbon product with an electrocatalyst material and/or a modified electrocatalyst product to form a mixture and incorporating the mixture into an electrode. It will be appreciated that more than one type of modified carbon product and/or electrocatalyst material and/or modified electrocatalyst product may be utilized in this approach to form the mixture.

Figure 12E:
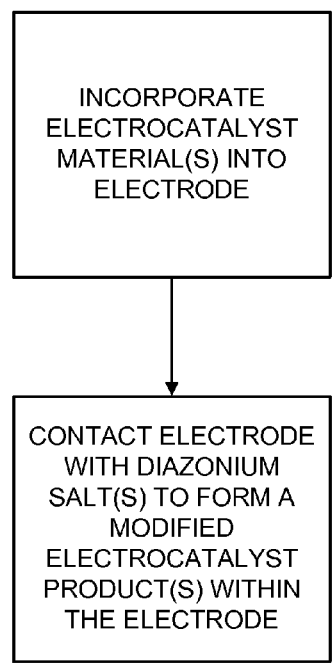

Another approach, as depicted in FIG. 12(e), includes the steps of incorporating the modified carbon product into the electrode and then contacting the modified carbon product with a diazonium salt to form a modified electrocatalyst product in the electrode. It will be appreciated that more than one type of modified carbon product and/or diazonium salt may be utilized in this approach to form a plurality of modified electrocatalyst product types.

Figure 13:
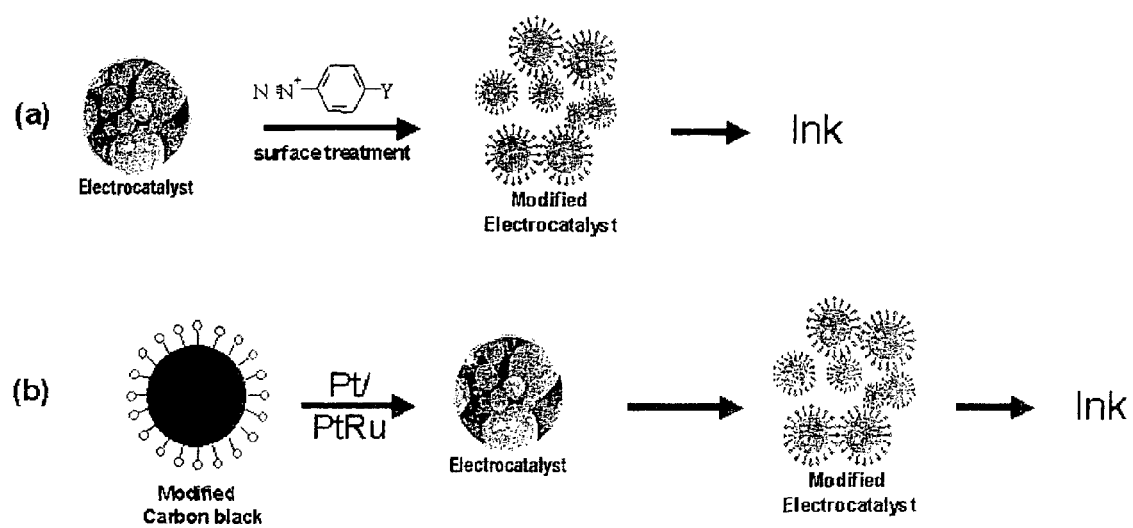
FIG. 13 illustrates the dispersion of electrocatalyst products into an ink in accordance with an embodiment of the present invention.

In one specific embodiment, modified electrocatalyst products are dispersed in an ink to for production of the electrocatalyst layer, such as by analog or digital printing, as discussed in further detail below. For example, and in reference to FIG. 13(a), the electrocatalyst material may be contacted by a diazonium salt, such as by the approaches of FIG. 12(b) or 12(c), above, to form a modified electrocatalyst product. Alternatively, a modified carbon product may be spray processed with an active species precursor, such as by the approach of FIG. 12(a), above, to form a modified electrocatalyst product. These modified electrocatalyst product may then be dispersed in an ink, as shown in FIG. 13(b), which may be utilized in the production of an electrocatalyst layer.

In another aspect, the modified carbon products can be intimately mixed with electrocatalyst material prior to forming the electrode. The mixture may then be deposited, for example in the form of a suspension or ink, to create the electrode. In one approach, the electrocatalyst material includes a precious metal and the modified carbon product is a modified carbon black. In one embodiment, the precious metal is platinum.

In one aspect, a pre-existing electrode including carbonaceous material can be surfaced modified with a diazonium salt, as described above, to create a surfaced modified electrode layer. In one approach, the electrode may include carbon black, and the functional group may include any of the previously listed organic groups, as appropriate depending on the properties desired to be imparted.

According to another embodiment of the present invention, modified carbon products and/or modified electrocatalyst products are utilized in the process of preparing the electrode, where the modified carbon products and/or modified electrocatalyst products can be more easily dispersed in a solvent, such as a liquid used in an ink. For example, a modified carbon product including a hydrophilic functional group can be utilized to increase the dispersability of the modified carbon product in a polar solvent such as water. In one preferred embodiment, the hydrophilic functional group is also a proton conductive group, such as a sulfonate group. For example, an electrocatalyst material including an active species phase, such as platinum, can be modified with a hydrophilic and/or proton conducting functional group, and subsequently placed in an aqueous based solvent for use as an ink. The resulting ink can be deposited to produce an electrocatalyst layer.

A combination of a modified carbon products and proton conducting materials in solution are also useful when forming electrode layers in that they provide a mix of surface and bulk proton conductive pathways (bulk in this case is defined as nano-sized aggregate that include more than on a monolayer of polymer).

By way of illustration, a modified electrocatalyst product including a hydrophilic functional group can be mixed with varying amounts of a proton conducting polymer solution. Various concentrations of these constituents can be utilized to create a wide variety of electrodes comprising proton conductive pathways, from electrodes including only of purely carbon surface-binded proton conductive groups, to electrodes including only connected nano-sized clusters of proton conducting polymer, and numerous variations there between. In one preferred embodiment, the solution contains not greater than 15 wt %, preferably not greater than 10 wt %, and more preferably not greater than 5 wt % of conventional proton conducting polymer material (e.g., NAFION).

By way of illustration, an ink including a modified electrocatalyst product having both hydrophobic and proton conducting functional groups attached thereto can be deposited on the surface of a proton exchange membrane and/or a gas/fluid diffusion layer to generate an electrode layer with reduced pore size. The generated electrode layer will also have an intimate mixture of hydrophilic and hydrophobic domains, allowing for efficient transportation paths for electrons, protons, gases and water.

In another example, a modified electrocatalyst product including hydrophobic functional groups and a modified electrocatalyst product including proton conducting functional groups can be blended into an ink and deposited to generate electrode layer having desired hydrophilic and hydrophobic properties.

According to one embodiment of the present invention, the electrode includes sub-layers where each of the sub-layers has a different degree of modification, thereby creating a selectively manufactured gradient in the electrode. For example a layer closest to the proton exchange membrane can have a high concentration of proton conducting surface groups and a low concentration of hydrophobic surface groups. A layer closest to the gas/fluid diffusion layer can have a high concentration of hydrophobic surface groups and a low concentration of proton conducting surface groups. Gradients in the surface groups can be of an almost continuous nature (gradual increase or decrease of certain functionality) from one side of the electrode to the other (through-plane) or of a discrete nature, with abruptly and selectively tailored changes in properties between the layers.

Deposition of Modified Carbon Products and/or Diazonium Salts

As noted above, deposition of a modified carbon ink and/or an electrocatalyst ink can be utilized to produce and/or modify an electrode. As used herein a "modified carbon ink" refers to any liquid phase solution, such as an ink, resin or paste, that contains one or more of the above-described modified carbon products and/or modified electrocatalyst products. As used herein "electrocatalyst inks" refers to a liquid phase solution, such as an ink, resin or paste, that contains one or more of the above-described electrocatalyst materials.

Various aspects, approaches, and/or embodiments of the present invention are described below, primarily in reference to modified carbon inks. However, it will be appreciated that electrocatalyst inks can be utilized in conjunction with a modified carbon ink in some of such aspects, approaches and/or embodiments, where appropriate, although not specifically mentioned, and the use of such electrocatalyst inks in such aspects, approaches and/or embodiments is expressly within the scope and spirit of the present invention.

The incorporation of modified carbon products in a modified carbon ink significantly improves ink uniformity, homogeneity, ease of manufacture and ease of use. Various methods and mixing techniques are currently utilized to improve the properties of inks that include electrocatalysts, carbons and polymer solutions (e.g., PFSA or PTFE) and combinations thereof, such as ball milling and sonication. The incorporation of modified carbon products having hydrophilic surface groups significantly simplifies ink preparation in aqueous-based inks due to increased wetting and dispersability of the modified carbon material. As a result, the homogeneity and uniformity of the inks, and hence the homogeneity of the deposited layer/feature are increased. Homogenous deposition enables control over the concentration and drying rate of the materials being deposited. Other surface modifications can be chosen to improve the wettability and dispersability of modified carbon products when organic solutions are used. In one embodiment of the present invention, modified carbon products are utilized in a PFSA solution and/or a PTFE suspension to create a modified carbon ink, where the aggregate size of the modified carbon particles is not larger than the size of the largest particle within the ink.

In a particular embodiment, a modified carbon product having two different surface groups (e.g. a hydrophilic and a hydrophobic group) is utilized in a PFSA solution and/or PTFE suspension to create a modified carbon ink. Where the aggregate size of the modified carbon products is not larger than the size of the largest particle within the ink.

Deposition of a modified carbon inks preferably produces and/or modifies the electrode to tailor one or more attributes of the electrode. For example, a modified carbon ink may be utilized in the production of and/or modification of the electrodes/electrocatalyst layers to tailor catalytic activity, proton electrical conductivity and/or adequate porosity after deposition and/or post-processing. In this regard, it should be noted that any combination of surface groups described in U.S. Pat. No. 5,900,029 by Belmont et al. can be utilized in conjunction with any modified carbon product in a modified carbon ink to create and/or modify the electrode layer. Preferably, the modified carbon ink is formulated for deposition (e.g., via analog or digital printing) to maintain a low manufacturing cost while retaining the above noted properties, as suitable for the respective component of the fuel cell.

The modified carbon ink according to the present invention can be deposited to form patterned or unpatterned layers using a variety of tools and methods. In one embodiment, the modified carbon ink is deposited using a direct-write deposition tool. As used herein, a direct-write deposition tool is a device that can deposit a modified carbon ink/electrocatalyst ink onto a surface by ejecting the composition through an orifice toward the surface without the tool being in direct contact with the surface. The direct-write deposition tool is preferably controllable over an x-y grid. One preferred direct-write deposition tool according to the present invention is an ink-jet device. Other examples of direct-write deposition tools include aerosol jets and automated syringes, such as the MICROPEN tool, available from Ohmcraft, Inc., of Honeoye Falls, N.Y.

An ink-jet device operates by generating droplets of a liquid suspension and directing the droplets toward a surface. The position of the ink-jet head is carefully controlled and can be highly automated so that discrete patterns of the modified carbon ink can be applied to the surface. Ink-jet printers are capable of printing at a rate of 1000 drops per second per jet, or higher, and can print linear features with good resolution at a rate of 10 cm/sec or more, such as up to about 1000 cm/sec. Each drop generated by the ink-jet head includes approximately 25 to 100 picoliters of the suspension/ink that is delivered to the surface. For these and other reasons, ink-jet devices are a highly desirable means for depositing materials onto a surface.

Typically, an ink-jet device includes an ink-jet head with one or more orifices having a diameter of not greater than about 100 µm, such as from about 50 µm to 75 µm. Droplets are generated and are directed through the orifice toward the surface being printed. Ink-jet printers typically utilize a piezoelectric driven system to generate the droplets, although other variations are also used. Ink-jet devices are described in more detail in, for example, U.S. Pat. No. 4,627,875 by Kobayashi et al. and U.S. Pat. No. 5,329,293 by Liker, each of which is incorporated herein by reference in its entirety. Functionalized carbon particles have been demonstrated to be stable in inks at relatively high carbon loadings by Belmont et al. in U.S. Pat. No. 5,554,739, which is incorporated herein by reference in its entirety. Ink-jet printing for the manufacture of DMFCs is disclosed by Hampden-Smith et al. in commonly-owned U.S. patent application Ser. No. 10/417,417 (Publication No. 20040038808) which is also incorporated herein by reference in its entirety.

It is important to simultaneously control the surface tension and the viscosity of the modified carbon ink to enable use of industrial ink-jet devices. Preferably, the surface tension of the ink is from about 10 to 50 dynes/cm, such as from about 20 to 40 dynes/cm. For use in an ink-jet, the viscosity of the modified carbon ink is preferably not greater than about 50 centipoise (cp), such as in the range of from about 10 cp to about 40 cp. Automated syringes can use compositions having a higher viscosity, such as up to about 5000 cp.

According to one embodiment, the solids loading of modified carbon products in the modified carbon ink is preferably as high as possible without adversely affecting the viscosity or other necessary properties of the composition. For example, a modified carbon ink can have a solids loading of up to about 20 wt. %. In one embodiment the solids loading is from about 2 wt. % to about 10 wt. %. In another particular embodiment, the solids loading is from about 2 wt. % to about 8 wt %. As is discussed above, the surface modification of a carbon product can advantageously enhance the dispersion of the carbon product, and lead to higher obtainable solids loadings.

The modified carbon ink used in an ink-jet device can also include water and/or an alcohol. Surfactants can also be used to maintain the modified carbon products in the ink. Co-solvents, also known as humectants, can be used to prevent the modified carbon inks from crusting and clogging the orifice of the ink-jet head. Biocides can also be added to prevent bacterial growth over time. Examples of such liquid vehicle compositions for use in an ink-jet are disclosed in U.S. Pat. No. 5,853,470 by Martin et al.; U.S. Pat. No. 5,679,724 by Sacripante et al.; U.S. Pat. No. 5,725,647 by Carlson et al.; U.S. Pat. No. 4,877,451 by Winnik et al.; U.S. Pat. No. 5,837,045 by Johnson et al.; and U.S. Pat. No. 5,837,041 by Bean et al. Each of the foregoing U.S. patents is hereby incorporated herein by reference in its entirety. The selection of such additives is based upon the desired properties of the composition. If necessary, modified carbon products can be mixed with the liquid vehicle using a mill or, for example, an ultrasonic processor. In this regard, it should be noted that modified carbon products that are dispersible in their corresponding solvent (e.g. a modified carbon product having a hydrophilic surface groups in an aqueous solution) may require minimal or no mixing due to their improved dispersability in their corresponding solvents.

The modified carbon inks according to the present invention can also be deposited by aerosol jet deposition. Aerosol jet deposition can enable the formation of features having a feature width of not greater than about 200 µm, such as not greater than 100 µm, not greater than 75 µm and even not greater than 50 µm. In aerosol jet deposition, the modified carbon ink is aerosolized into droplets and the droplets are transported to a substrate in a flow gas through a flow channel. Typically, the flow channel is straight and relatively short. For use in an aerosol jet deposition, the viscosity of the ink is preferably not greater than about 20 cp.

The aerosol in the aerosol jet can be created using a number of atomization techniques, such as by ultrasonic atomization, two-fluid spray head, pressure atomizing nozzles and the like. Ultrasonic atomization is preferred for compositions with low viscosities and low surface tension. Two-fluid and pressure atomizers are preferred for higher viscosity inks.

The size of the aerosol droplets can vary depending on the atomization technique. In one embodiment, the average droplet size is not greater than about 10 µm, and more preferably is not greater than about 5 µm. Large droplets can be optionally removed from the aerosol, such as by the use of an impactor.

Low aerosol concentrations require large volumes of flow gas and can be detrimental to the deposition of fine features. The concentration of the aerosol can optionally be increased, such as by using a virtual impactor. The concentration of the aerosol can be greater than about $10^6$ droplets/cm$^3$, such as greater than about $10^7$ droplets/cm$^3$. The concentration of the aerosol can be monitored and the information can be used to maintain the mist concentration within, for example, 10% of the desired mist concentration over a period of time.

Examples of tools and methods for the deposition of fluids using aerosol jet deposition include U.S. Pat. No. 6,251,488 by Miller et al., U.S. Pat. No. 5,725,672 by Schmitt et al. and U.S. Pat. No. 4,019,188 by Hochberg et al. Each of these patents is hereby incorporated herein by reference in its entirety.

The modified carbon inks of the present invention can also be deposited by a variety of other techniques including intaglio, roll printer, spraying, dip coating, spin coating and other techniques that direct discrete units, continuous jets or continuous sheets of fluid to a surface. Other printing methods include lithographic and gravure printing.

For example, gravure printing can be used with modified carbon inks having a viscosity of up to about 5000 centipoise. The gravure method can deposit features having an average thickness of from about 1 µm to about 25 µm and can deposit such features at a high rate of speed, such as up to about 700 meters per minute. The gravure process also enables the direct formation of patterns onto the surface.

Lithographic printing methods can also be utilized. In the lithographic process, the inked printing plate contacts and transfers a pattern to a rubber blanket and the rubber blanket contacts and transfers the pattern to the surface being printed. A plate cylinder first comes into contact with dampening rollers that transfer an aqueous solution to the hydrophilic non-image areas of the plate. A dampened plate then contacts an inking roller and accepts the ink only in the oleophillic image areas.

The aforementioned deposition/printing techniques may require one or more subsequent drying and/or curing (e.g., heating) steps, such as by thermal, ultraviolet and/or infrared radiation, to induce a chemical or physical bond formation. For example, if a long chain fluoric substituted aryl is used, the resulting deposited layer can be dried (e.g., at 100° C.) and heated (e.g., 350° C.) to induce mobility and physical bond formation between adjacent modified carbon products through a surface substituted aryl group.

By way of illustration, a low viscosity modified carbon ink including a modified carbon product having a hydrophobic surface group can be deposited using a direct-write tool (e.g., an ink jet printer) to form a hydrophobic layer. After the deposited layer is dried (e.g., at about 100° C.), it can be heated (at about 350° C.) for a certain period of time (e.g., 30 minutes) to enable the hydrophobic groups to become mobile and intertwine with adjacent surface groups on the same and different carbon particles, thereby resulting in a hydrophobic layer with a greater level of structural integrity.

Using one or more of the foregoing deposition techniques, it is possible to deposit a modified carbon ink on one side or both sides of a surface (e.g., a membrane surface) to form and/or modify a component of the fuel cell (e.g., an electrocatalyst layer/electrode). According to one embodiment, such deposition techniques are used to directly create the electrode layer(s), such as by depositing a modified carbon ink and/or an electrocatalyst ink onto another component of the MEA, such as a proton exchange membrane and/or a fluid diffusion layer.

It will be appreciated that any of the above-noted processes can be utilized in parallel or serial to deposit multiple layers of the same or different modified carbon inks onto a surface, and can be printed in one or more dimensions and in single or multiple deposition steps. In this regard, one embodiment of the present invention is directed to printing multiple layers of modified carbon inks and/or electrocatalyst inks to generate gradients in one or more components of the fuel cell.

In one particular embodiment, gradient structures can be prepared that have material properties that transition from very hydrophilic to very hydrophobic, such as by utilizing a plurality of layers including modified carbon products or modified carbon products having varying concentrations of surface groups. In this regard, a first layer may include a modified carbon product that is very hydrophilic, such as a modified carbon product having a hydrophilic terminated surface group attached to the surface (e.g., a sulfuric group). On this first layer, a second, slightly less hydrophilic layer can be formed, such as by using a modified carbon product/modified electrocatalyst product that has slightly hydrophilic surface groups (e.g., a carboxylic group). A third, hydrophobic layer can be formed on the second layer utilizing a hydrophobic modified carbon product having a hydrophobic surface group. It will be appreciated that in any of these layers, more than one type of surface group can be utilized with the various modified carbon products.

By way of example, a gradient structure may enable a novel water removal path for removing water from the electrode in a controlled fashion, thereby preventing gas blockage and subsequent fuel cell flooding. An intimate mixture of hydrophobic modified carbon products within the electrode enables provides for effective water ejection at lower pressure, which is especially advantageous for operating fuel cells at lower pressures (e.g., atmospheric or slightly above atmospheric). In addition to utilizing hydrophilic modified carbon products, water removal properties may also be improved by reducing microporosity, as described above.

It will be appreciated that any of the above referenced deposition methods can be utilized to directly deposit a diazonium salt onto carbonaceous surface for the purpose of directly modifying such carbonaceous surface, such as any of the surfaces of the bipolar plates and/or the fluid diffusion layer. Additionally, such depositions can be used to modify any previously deposited carbonaceous materials, including non-modified carbon materials, electrocatalyst materials, modified carbon products and/or modified electrocatalyst products, such as any of those contained in the electrode. It will also be appreciated that such deposition techniques can be utilized to create a uniform modified carbon layer across the entire surface of the electrode, or can be deposited in discrete patterns to produce patterned modified carbon layers.

Figure 14:
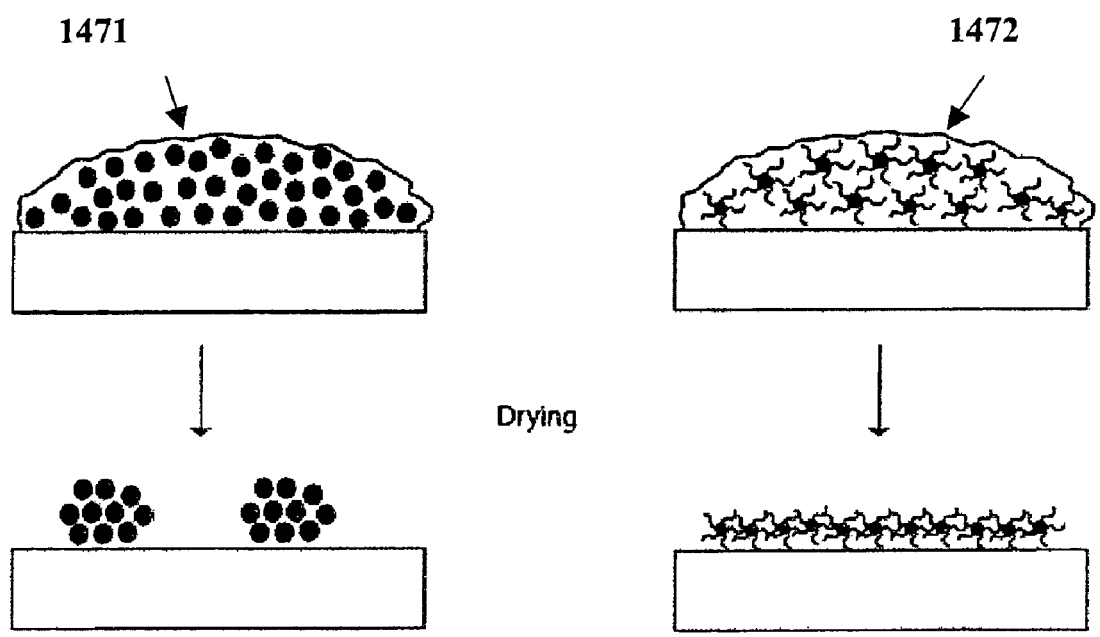
FIG. 14 illustrates the use of modified carbon products to decrease cracking during drying as compared to the prior art and according to an embodiment of the present invention.

The incorporation of modified carbon products in a modified carbon ink can also affect the drying characteristics of ink. For example, rapid drying can result in crack formation after deposition. Drying can be slowed by utilizing modified carbon products miscible with the solvent to reduce the vapor pressure of the solvent after deposition. This can be achieved by increased the solids loading of the modified carbon products in the modified carbon ink. In one preferred embodiment, the modified carbon ink has a solids loading of up to about 70 wt. %. Increased solids loading of modified carbon produced results in more uniform drying and less volume fraction of solvents being removed during drying process. In addition, modified carbon products can include a long chain surface group (e.g., polymeric) that can form physical and/or chemical bonds to the solvent species (e.g., water, isopropanol or TEFLON) or adjacent surface groups, resulting in more uniform drying as depicted in FIG. 14, where 1471 is a deposition process using a conventional ink and 1472 is a deposition processing using a modified carbon ink.

EXAMPLES

A. Preparation of Pt Electrocatalysts by Spray-Based Processing Utilizing Modified Carbon Products Example A-1

50% Pt/C, 1 g Batch 3.7 g of a 13.6 wt. % $Pt(NO_3)_2$ solution is added to 0.77 g of $SO_3H$-modified KETJEN BLACK 600 dispersed in 15.5 g distilled water. The resulting 5 wt. % solids dispersion is sheared for 5 minutes, then fed into a spray-pyrolysis system. The spray pyrolysis is conducted on an ultrasonic transducer system at a furnace temperature of 500° C., with air as the carrier gas at 5 SLPM.

Example A-2

60% Pt/C, 1 g Batch 4.4 g of a 13.6 wt. % $Pt(NO_3)_2$ solution is added to 0.61 g of $SO_3H$-modified KETJEN BLACK 600 dispersed in 15 g distilled water. The resulting 5 wt. % solids dispersion is sheared for 5 minutes, then fed into a spray-pyrolysis system. The spray pyrolysis is conducted on an ultrasonic transducer system at a furnace temperature of 500° C., with air as the carrier gas at 5 SLPM.

Example A-3

60% Pt/C, 1 g Batch 4.4 g of a 13.6 wt. % $Pt(NO_3)_2$ solution is added to 0.61 g of $SO_3H$-modified KETJEN BLACK 600 dispersed in 5 g distilled water. The resulting 10 wt. % solids dispersion is sheared for 5 minutes, then fed into a spray-pyrolysis system. The spray pyrolysis is conducted on an ultrasonic transducer system at a furnace temperature of 500° C., with air as the carrier gas at 5 SLPM.

Example A-4

50% Pt/C, 1 g Batch 3.7 g of a 13.6 wt. % $Pt(NO_3)_2$ solution is added to 0.76 g of $SO_3H$-modified KETJEN BLACK 600 dispersed in 35.6 g distilled water. The resulting 2.5 wt. % solids dispersion is sheared for 5 minutes, then fed into a spray-pyrolysis system. The spray-pyrolysis is conducted on an ultrasonic transducer system at a furnace temperature of 500° C., with air as the carrier gas at 5 SLPM.

Example A-5

60% Pt/C, 1 g Batch 4.4 g of a 13.6 wt. % $Pt(NO_3)_2$ solution is added to 0.5 g of $CO_2H$-modified KETJEN BLACK 600 dispersed in 15 g distilled water. The resulting 5 wt. % solids dispersion is sheared for 5 minutes, then fed into a spray-pyrolysis system. The spray-pyrolysis is conducted on an ultrasonic transducer system at a furnace temperature of 500° C., with air as the carrier gas at 5 SLPM.

Example A-6

60% Pt/C, 1 g Batch 4.4 g of a 13.6 wt. % $Pt(NO_3)_2$ solution is added to 0.5 g of $CF_3$-modified KETJEN BLACK 600 dispersed in 15 g distilled water. The resulting 5 wt. % solids dispersion is sheared for 5 minutes, then fed into a spray-pyrolysis system. The spray-pyrolysis is conducted on an ultrasonic transducer system at a furnace temperature of 500° C., with air as the carrier gas at 5 SLPM.

Example A-7

60% Pt/C, 1 g Batch 4.4 g of a 13.6 wt. % $Pt(NO_3)_2$ solution is added to 0.5 g of $SO_3H$ and $CF_3$-modified KETJEN BLACK 600 dispersed in 15 g distilled water. The ratio of $SO_3H:CF_3$ groups in the starting carbon is 2:1. The resulting 5 wt. % solids dispersion is sheared for 5 minutes, then fed into a spray-pyrolysis system. The spray-pyrolysis is conducted on an ultrasonic transducer system at a furnace temperature of 500° C., with air as the carrier gas at 5 SLPM.

B. Preparation of PtVC and PtRu/C Electrocatalysts Utilizing Modified Carbon Products Through a Secondary, Surface Modification Procedure Example B-1

Supported 60% Pt/C and 60% PtRu/C are modified by addition of $SO_3H$ groups on the carbon surface. The level of treatment on the electrocatalyst is dependent on a number of factors such as surface area of the sample and metal content of the sample. 0.75 mmole/g of $SO_3H$ groups are attached to the Pt/C electrocatalyst and 0.8 mmole/g of $SO_3H$ group are attached to the PtRu/C electrocatalyst, determined experimentally. Surface area of the 60% Pt and 60% PtRu modified electrocatalysts is determined to be 260 $m^2/g$ and 205 $m^2/g$ respectively. A smaller particle size distribution is obtained upon surface modification with $SO_3H$ groups. There is a decrease in $d_{50}$ from 5 µm to 3 µm for the modified Pt/C electrocatalyst and a decrease in $d_{50}$ from 9 micron to 4.5 micron for the modified PtRu/C electrocatalyst. Smaller PSD for the modified electrocatalysts is promising and desirable for ink-jetting as particle sizes greater than 2 µm result in clogging of ink-jet heads. Further, dispersability of the modified electrocatalysts increased compared to the as prepared electrocatalysts.

TABLE VI

|  | 60% Pt/C | modified 60% Pt/C | 60% PtRu/C | modified 60% PtRu/C |
|---|---|---|---|---|
| BET Surface Area | 320 m²/g | 260 m²/g | 315 m²/g | 205 m²/g |
| PSD | 2.4, 5.3, 15.9 | 0.3, 3.4, 12.5 | 3.3, 9, 21 | 0.5, 4.5, 18.1 |
| XRD Area | 80 | 50 | 120 | 115 |
| EDS (S wt %) | 0 | 1.35 | 0 | 1.9 |
| TGA, % metal | 61 | 55 | 73 | 59 |

C. Preparation of Pt/C Electrocatalyst for High Temperature Applications Utilizing Modified Carbon Products Through a Secondary, Surface Modification Procedure

Example C-1

A 20% Pt/VULCAN XC-72 catalyst is dispersed in an aqueous solution of $ArNH_2$, $NaNO_2$ and HX, where $Ar=HO_3P$—$(C_6H_4)$—and X=Cl, resulting in the formation of the diazonium salt $ArN\equiv N^+X^-$ which reacts with the carbon surface of the above mentioned catalyst to form a Pt/modified carbon product) catalyst whose carbon surface is modified with —$(C_6H_4)$—$PO_3H$ groups.

The Pt/modified carbon product catalyst is rinsed thoroughly to remove by-products of the reaction and the isolated Pt/Carbon catalyst is then re-dispersed in a 4:1 isopropanol/water solution as to give approximately 2 wt % catalyst solution. The solution further contains approximately 0.2 wt % Teflon, 10% based on Pt/modified carbon product.

The resulting solution is sprayed onto a high temperature PBI (polybenzimidazole) membrane or fluid diffusion layer to form a catalyst coated membrane. The catalyst layer is then doped with phosphoric acid, $H_3PO_4$, by placing the catalyst layer in contact with a solution, approximately 1 molar, of $H_3PO_4$/ethanol.

The —$PO_3H$ modified carbon product results in increasing proton conductivity in the catalyst layer as well as decreasing the leaching of phosphoric acid from the catalyst layer during fuel cell operation through increased hydrogen bonding.

D. Examples of Modified Carbon Products in Hydrogen-Air Fuel Cell Electrodes Relating to Increased Proton Conductivity

Example D-1

An electrocatalyst, made by spray processing or any other method, where $SO_3H$ or mixed $SO_3H/CF_3$ and $SO_3H/C_8F_{18}$ groups (in a molar ratio of 3:1) are preformed on the carbon support and present at the electrocatalyst surface after conversion of Pt precursor either at the same amount as before the electrocatalyst formation or at a reduced amount, is incorporated in an electrocatalyst ink, where the ratio of electrocatalyst to NAFION (introduced as standard NAFION suspension) is varied from 4:1 to 2:1.

Example D-2

A 50 wt. % PtRu/KETJEN BLACK 600 or 50 wt. % Pt/KETJEN BLACK 600 electrocatalyst, is modified with $SO_3H$ post-treatment with concentrations of 0.15, 0.3 and 0.6 mmol/g level treatments, is incorporated into an electrode layer, preferably in an anode layer for DMFC or anode layer for hydrogen-air fuel cell, respectively.

Example D-3

A 50 wt. % Pt/KETJEN BLACK with $SO_3H$ post treatment with 0.15, 0.3 and 0.6 mmol/g level treatments is incorporated into an electrode layer, where the ratio of electrocatalyst to NAFION is from 8:1 to 2:1.

Example D-4

A modified carbon black or modified electrocatalyst with different levels of $(C_6H_4)SO_3H$ groups (0.4 and 10.7 wt. %) was used to form electrocatalyst ink suspension that was then hot-pressed onto polycarbonate films (polycarbonate is used instead of NAFION because it is a nonconductor and prevents current losses outside the catalyst layer). The total DC resistance of this assembly was determined from the impedance response by reading the low frequency intercept with the real axis. (Reference: A. P. Saab, F. H. Garzon and T. A. Zawodzinski, *Journal of The Electrochemical Society*, 150, (2) A214-A218, 2003). A DC polarization is used to obtain the iV response and from there the electronic resistance. Assuming that the overall resistance is the parallel combination of the ionic and electronic resistances, the ionic resistance can be calculated from the following equation:

$$\frac{1}{R_{DC\_overall}} = \frac{1}{R_{ionic}} + \frac{1}{R_{electronic}}$$

$R_{DC\_overall}$ is the overall DC resistance obtained from the impedance spectrum $R_{electronic}$ is the electronic resistance obtained from the DC polarization experiment $R_{ionic}$ is the ionic resistance of the assembly The ionic resistivity of the modified carbons, electrocatalysts or electrodes decreases drastically as the degree of the treatment is increased. The ionic resistivity decreases from 245 ohm-cm for the untreated carbon to 110 ohm-cm for the 4 wt. % treated carbon to 20 ohm-cm for the 10.7 wt % treated carbon. The electronic resistivity increases from 0.16 ohm-cm for the untreated carbon to 0.32 ohm-cm for the 4 wt % treated carbon to 9.9 ohm-cm for the 10.7 wt % treated carbon. These measurements confirm that the attached $(C_6H_4)SO_3H$ groups are proton conducting.

Example D-5

A supported Pt catalyst, e.g., 20% Pt on VULCAN XC-72, was used to prepare the following fuel cell cathodes:

(1) 20% Pt/VXC-72 is mixed with a PTFE suspension and then deposited on a commercially available hydrophobic fluid diffusion layer (ELAT, available from ETEK). The resulting coated GDL is then heat treated at ca. 360° C. for about an hour to make the PTFE flow and disperse throughout the catalytic layer. No NAFION ionomer is added to the catalytic layer so there are no —$SO_3H$ groups within the electrode;

(2) Same as (1), but NAFION is sprayed onto the resulting catalytic layer introducing in this way a certain (calculable) loading of —$SO_3H$ groups.

(3) Same as (1), but either the carbon support, the electrocatalyst or the resulting electrode is subjected to a diazonium salt reaction to attach $(C_6H_4)SO_3H$ groups to the carbon support. This introduces a loading of —$SO_3H$ groups.

The 3 cathodes are pressed on NAFION membranes with common anodes. Testing the 3 MEAs provides in-situ proof that the introduction of the —$SO_3H$ groups gives the catalytic layer of cathode (3) proton conductivity when compared with cathode (1). The performance of MEA made with cathode (3) is significantly better than the performance of MEA made with cathode (1). The performance of MEA made with cathode (2) serves as a baseline for tailoring the content of —$SO_3H$ groups that need to be added via the diazonium salt reaction.

It is, perhaps, beneficial to test MEAs with cathodes at various treatment levels in an attempt to determine the optimum —$SO_3H$ loadings. If the loading of —$SO_3H$ groups in the case of cathode (3) is smaller than the loading of —$SO_3H$ groups in the case of cathode (2) but the performances are similar, it means that some of the —$SO_3H$ groups in the case of cathode (2) do not exercise their functionality.

E. Examples of Modified Carbon Products in Hydrogen-Air Fuel Cell Electrodes Relating to Improved Water Management Example E-1

As discussed previously, the introduction of —$SO_3H$ groups in the catalyst layer confer the electrode is hydrophilic in character. The introduction of these groups at the cathode side of the $H_2$-air fuel cell have to be balanced with the introduction of hydrophobic groups to prevent water flooding. However, some water retention at the anode of a fuel cell is beneficial in order to run the electrode at reduced levels of relative humidity. In order to probe the potential advantage of the above-mentioned anodes, the following experiment is performed.

One MEA with a classic cathode (see the MEA with cathode 2 described above in the previous section) and an anode prepared in the same way as cathode 3 above in the previous experiment) are prepared and run at anode humidification-levels between 0 and 100% relative humidity. The modification is proven successful (due to the increase in performance of the carbon helps with the water management) from the increase in performance of the fuel cell at decreasing humidification levels at higher currents.

Example E-2

A $CF_3$ and/or $C_8F_{18}$ pretreated BLACK PEARLS 700 (carbon black) at 0.15, 0.3 and 0.6 mmol total/g level was applied in an electrode layer in combination with 50 wt. % Pt/KETJEN BLACK 600 standard catalyst with addition of NAFION to the ink formulation.

Example E-3

A 40 wt. % Pt/Vulcan XC-72 post treated with $SO_3H$ and/or $C_8F_{18}$ modification at 0.15, 0.3 and 0.6 mmol total/g level of treatment (molar ratio of $SO_3H$ to $C_8F_{18}$ was 1:1) was mixed with SHAWINAGAN BLACK or BLACK PEARLS 700 carbon blacks in an electrocatalyst ink including NAFION suspension. The electrocatalyst to carbon blacks volume ratio was varied from 10:1 to 5:1 and the NAFION to total carbon ration was varied from 5:1 to 1:1.

Example E-4

A spray processed or made by any other method 20 wt. % Pt/SHAWINIGAN BLACK carbon that contained in its final form a $SO_3H/CF_3$ or $SO_3H/C_8F_{18}$ treatments at 3:1 and 2:1 molar ratio and 0.15, 0.3 and 0.6 mmol total/g level treatments is mixed in an electrocatalyst ink with or without Teflon and NAFION additives.

Example E-5

A post-treated 50 wt. % Pt/KETJEN BLACK 600 with $SO_3H/CF_3$ and/or $SO_3H/C_8F_{18}$ treatments at 3:1 and 2:1 molar ratio and 0.15, 0.3 and 0.6 mmol total/g level treatments is mixed in an electrocatalyst ink and printed onto a membrane or a fluid diffusion layer and the MEA constructed of these was able to operate at lower humidification levels of reactant gases.

Example E-6

A treated 50 wt. % Pt/KETJEN BLACK 600 with $SO_3H/CF_3$ or $SO_3H/C_8F_{18}$ treatments at 3:1 and 2:1 molar ratio and 0.15, 0.3 and 0.6 mmol total/g level treatments is mixed with various amounts of NAFION and printed onto a membrane or to a fluid diffusion layer to create an MEA capable of operation at low pressure and at a range of humidity conditions.

Example E-7

A treated 50 wt. % Pt/KETJEN BLACK 600 with $SO_3H/CF_3$ and $SO_3H/C_8F_{18}$ treatments at 3:1 and 2:1 molar ratio and 0.15, 0.3 and 0.6 mmol total/g level treatments is used to print a vertical hydrophobicity gradient electrode.

Example E-8

A treated 50 wt. % Pt/KETJEN BLACK 600 with $SO_3H/CF_3$ and $SO_3H/C_8F_{18}$ treatments at 3:1 and 2:1 molar ratio and 0.15, 0.3 and 0.6 mmol total/g level treatments is used to print a patterned hydrophobicity electrode where certain parts of the pattern are more hydrophobic than other parts of the pattern.

Example E-9

A mix of treated 50 wt. % Pt/KETJEN BLACK 600 with $SO_3H/CF_3$ or $SO_3H/C_8F_{18}$ treatments at 3:1 and 2:1 molar ratio and 0.15, 0.3 and 0.6 mmol total/g level treatments and 20 wt. % Pt/SHAWINIGAN BLACK with $SO_3H/CF_3$ or $SO_3H/C_8F_{18}$ treatments at 5:1 and 3:1 molar ratio and 0.15, 0.3 and 0.6 mmol total/g level treatments is mixed with various amounts of NAFION and printed onto a membrane or to a fluid diffusion layer to create an MEA capable of operation at low pressure and at a range of humidity conditions.

F. Examples of Modified Carbon Products in Hydrogen-Air Fuel Cell Electrodes Relating to Increased Proton Catalyst Utilization Example F-1

Supported catalysts on modified carbon blacks can be achieved in two ways.
1) modification of the carbon and then addition of the catalyst;
2) addition of the modifying groups on commercially available (or experimental) catalysts. C Either way, Pt utilization is determined by performing the following experiment:

The resulting powder is characterized by XRD and TEM to determine the particle size of the catalyst. This is compared to the particle size of the unmodified catalyst.

The powder is subjected to an ex-situ carbon monoxide adsorption experiment, which provides the surface area ($A_1$ m$^2$/g) of the Pt before the powder is converted in an MEA.

The powder is then converted in an MEA and the surface area is determined by means of CO adsorption and anodic stripping of the adsorbed CO ($A_2$ m$^2$/g). The utilization of the catalyst is calculated with the following formula:

$$\eta = \frac{A_2}{A_1} \cdot 100$$

The value of utilization ($\eta$) is compared with the value of utilization obtained for the traditional unmodified catalysts, prepared by the classic methods (with NAFION and PTFE).

G. Preparation of Alloy Electrocatalysts

Example G-1

60% PtRu/Modified Carbon Black KB SO$_3$H, 1 g Batch 2.4 g of a 13.7 wt. % Pt(NO$_3$)$_2$ solution was added to 0.76 g of SO$_3$H-modified KB dispersed in 15 g distilled water, followed by 1.6 g of a 10.7 wt % Ru(NO)(NO$_3$)$_3$ solution. The resulting 5 wt. % solids dispersion was sheared for 5 minutes, then fed into a spray pyrolysis system. The spray pyrolysis was conducted on an ultrasonic transducer system at a furnace temperature of 500° C., with air carrier gas at 5 SLPM. The collected powder is then post-processed under forming gas for 2 hours at 250° C.

Example G-2

20% PtNiCo/Modified Carbon Black Vulcan XC-72 SO$_3$H, 1 g Batch 2.8 g of a 13.7 wt. % Pt(NO$_3$)$_2$ solution is added to 0.55 g of SO$_3$H-modified Vulcan XC-72 dispersed in 8 g distilled water. 0.3 g Ni(NO$_3$)$_2$6H2O and 0.3 g Co(NO$_3$)$_2$6H2O were each dissolved in 4 g distilled water. The resulting 5 wt. % solids dispersion is sheared for 5 minutes, then fed into a spray pyrolysis system. The spray pyrolysis is conducted on an ultrasonic transducer system at a furnace temperature of 500° C., with air carrier gas at 5 SLPM. The collected powder is then post-processed under forming gas for 2 hours at 250° C.

While various embodiments of the present invention have been described in detail, it is apparent that modifications and adaptations to those embodiments will occur to those skilled in the art. It is to be expressly understood, however, that such modifications and adaptations are within the scope and spirit of the present invention, as set forth in the claims below. Further, it should be recognized that any feature of any embodiment disclosed herein can be combined with any other feature of any other embodiment in any combination.

What is claimed is:

1. A method for making an electrocatalyst, comprising the steps of:
   providing a particulate carbon support comprising a functional group covalently attached to said carbon support to form a particulate modified carbon support product, wherein the functional group is a hydrophilic proton conducting group selected from the group consisting of carboxylic acids, sulfonic acids, phosphonic acids and phosphonic acid salts; and
   spray processing a suspension comprising said particulate modified carbon support product and an active species phase precursor solution comprising a precursor to said active species phase to deposit said active species phase onto said particulate modified carbon support product and form said electrocatalyst.

2. A method as recited in claim 1, wherein said functional group is covalently attached to said particulate carbon support by reacting a diazonium salt in the presence of said carbon support.

3. A method as recited in claim 1, wherein said particulate carbon support comprises carbon black.

4. A method as recited in claim 1, wherein said particulate carbon support comprises graphitic carbon.

5. A method as recited in claim 1, wherein said active species phase precursor preferentially attaches to said functional group.

6. A method as recited in claim 1, wherein said active species phase precursor preferentially attaches to the surface of said particulate carbon support.

7. A method as recited in claim 1, wherein said functional group is covalently attached to said particulate carbon support by a linking group selected from the group consisting of alkyls, aryls, halogenated alkyls, halogenated aryls, substituted alkyls, substituted aryls, polymers and substituted polymers.

8. A method as recited in claim 1, wherein said active species phase comprises Pt.

9. A method as recited in claim 1, wherein said active species phase comprises PtRu.

10. A method as recited in claim 1, wherein said active species phase comprises Co.

11. A method as recited in claim 1, wherein said active species comprises Ni.

12. A method as recited in claim 1, wherein said active species phase comprises PtNiCo.

13. A method as recited in claim 1, wherein said active species phase comprises PtCrCo.

14. A method as recited in claim 1, wherein said active species phase comprises Fe.

15. A method as recited in claim 1, wherein said active species phase comprises a metal oxide of at least one of the elements selected from the group consisting of Au, Ag, Pt, Pd, Ni, Co, Rh, Ru, Fe, Mn, Cr, Mo, Re, W, Ta, Nb, V, Hf, Zr, Ti or Al.

16. A method as recited in claim 1, wherein said active species phase comprises at least one metal selected from the group consisting of Pt, Ag, Pd, Ru, Os, Ni, Rh, Ir, Co, Cr, Mo, W, V, Nb, Al, Ta, Ti, Zr, Hf, Zn, Fe, Cu, Ga, In, Si, Ge, Sn, Y, La and lanthanide metals.

17. A method as recited in claim 1, wherein said active species phase comprises an alloy of Pt with at least one other metal selected from the group consisting of Ru, Os, Cr, Ni, Mn and Co.

18. A method as recited in claim 2, wherein said functional group is covalently attached to said particulate carbon support by spray processing a modified carbon precursor solution comprising a carbon material and a diazonium salt.

19. A method as recited in claim 1, wherein said spray processing step comprises spray processing said suspension in a spray dryer.

20. A method as recited in claim 1, wherein said precursor to an active species phase comprises a platinum compound.

* * * * *